US010791544B2

(12) United States Patent
Jung et al.

(10) Patent No.: US 10,791,544 B2
(45) Date of Patent: *Sep. 29, 2020

(54) D2D OPERATION METHOD PERFORMED BY TERMINAL IN WIRELESS COMMUNICATION SYSTEM AND TERMINAL USING SAME

(71) Applicant: LG ELECTRONICS INC., Seoul (KR)

(72) Inventors: Sunghoon Jung, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/162,140

(22) Filed: Oct. 16, 2018

(65) Prior Publication Data

US 2019/0053198 A1    Feb. 14, 2019

Related U.S. Application Data

(63) Continuation of application No. 15/113,028, filed as application No. PCT/KR2015/001076 on Feb. 2, 2015, now Pat. No. 10,251,160.

(Continued)

(51) Int. Cl.
*H04W 72/04* (2009.01)
*H04W 72/02* (2009.01)
*H04W 76/14* (2018.01)

(52) U.S. Cl.
CPC ........... *H04W 72/04* (2013.01); *H04W 72/02* (2013.01); *H04W 76/14* (2018.02); *H04W 72/042* (2013.01)

(58) Field of Classification Search
CPC ..... H04W 48/14; H04W 4/008; H04W 4/023; H04W 52/0216; H04W 52/0229; H04W 88/04; H04W 8/005; Y02B 60/50
See application file for complete search history.

(56) References Cited

U.S. PATENT DOCUMENTS

2015/0029866 A1\* 1/2015 Liao ...................... H04W 4/023
370/241
2015/0215903 A1\* 7/2015 Zhao ...................... H04W 72/04
370/329

(Continued)

FOREIGN PATENT DOCUMENTS

CN      102318421        1/2012
WO   2012159270 A1   11/2012

OTHER PUBLICATIONS

Nokia et al., "Resource allocation and inter-cell discovery", 3GPP TSG-RAN WG1 Meeting #75, R1-135594, Nov. 2, 2013, 4 pages.

(Continued)

*Primary Examiner* — Awet Haile
(74) *Attorney, Agent, or Firm* — Lee Hong Degerman Kang Waimey

(57) ABSTRACT

Provided are a device-to-device (D2D) operation method and device which are performed by a terminal in a wireless communication system. The method comprises: receiving D2D configuration information indicating a plurality of resources which can be used for a D2D operation from a network; selecting a specific resource from among the plurality of resources; and performing the D2D operation with another terminal using the selected specific resource, wherein the specific resource is selected on the basis of a reference signal received power (RSRP) which the terminal has received from the network.

8 Claims, 21 Drawing Sheets

Related U.S. Application Data

(60) Provisional application No. 61/935,849, filed on Feb. 5, 2014, provisional application No. 61/934,642, filed on Jan. 31, 2014.

(56) References Cited

U.S. PATENT DOCUMENTS

| | | | |
|---|---|---|---|
| 2015/0223147 | A1 | 8/2015 | Fujishiro et al. |
| 2015/0230114 | A1* | 8/2015 | Delsol ............... H04W 36/0094 370/252 |
| 2015/0264677 | A1* | 9/2015 | He ....................... H04W 72/02 370/312 |
| 2016/0081073 | A1 | 3/2016 | Lindoff et al. |
| 2016/0212784 | A1* | 7/2016 | Fujishiro ............. H04W 72/048 |
| 2017/0013598 | A1 | 1/2017 | Jung et al. |

OTHER PUBLICATIONS

LG Electronics, "Discussion on Resource Allocation in D2D Communications", 3GPP TSG RAN WG1 Meeting #75, R1-135482, Nov. 1, 2013, 15 pages.

ZTE, "Discussion of D2D Discovery", 3GPP TSG-RAN WG1 #74, R1-133149, Aug. 10, 2013, 10 pages.

Renesas Mobile Europe Ltd, "ProSe direct communication (D2D)", 3GPP TSG-RAN WG1 Meeting #73, R1-132174, May 11, 2013, 4 pages.

Korean Intellectual Property Office Application No. 10-2016-7019119, Notice of Allowance dated Jan. 12, 2018, 2 pages.

LG Electronics, "Operation in Type 1 resource allocation for D2D discovery", R1-141351, 3GPP TSG RAN WG1 Meeting #76bis, Apr. 2014, 9 pages.

InterDigital, "Evaluation results for D2D PUSCH resource allocation methods", R1-135607, 3GPP TSG-RAN WG1 Meeting #75, Nov. 2013, 6 pages.

United States Patent and Trademark Office U.S. Appl. No. 15/113,028, Final Office Action dated Mar. 22, 2018, 8 pages.

United States Patent and Trademark Office U.S. Appl. No. 15/113,028, Office Action dated Nov. 14, 2017, 13 pages.

Korean Intellectual Property Office Application No. 10-2016-7019119, Office Action dated Aug. 8, 2017, 5 pages.

CATT, "Further discussion on resource allocation for D2D discovery", R1-135089, 3GPP TSG RAN WG1 Meeting #75, Nov. 2013, 8 pages.

Qualcomm Incorporated, "Techniques for D2D Discovery", R1-133600, 3GPP TSG-RAN WG1 #74, Aug. 2013, 26 pages.

State Intellectual Property Office of the People's Republic of China Application Serial No. 201580006520.6, Office Action dated Oct. 9, 2018, 8 pages.

* cited by examiner

Ranges of serving cell signal strength /quality

Ranges of serving cell signal strength /quality

D2D OPERATION METHOD PERFORMED BY TERMINAL IN WIRELESS COMMUNICATION SYSTEM AND TERMINAL USING SAME

CROSS-REFERENCE TO RELATED APPLICATIONS

This application is a continuation of U.S. patent application Ser. No. 15/113,028, filed on Jul. 20, 2016, U.S. Pat. No. 10,251,160, which the National Stage filing under 35 U.S.C. 371 of International Application No. PCT/KR2015/001076, filed on Feb. 2, 2015, which claims the benefit of U.S. Provisional Application No. 61/934,642, filed on Jan. 31, 2014 and 61/935,849, filed on Feb. 5, 2014, the contents of which are all hereby incorporated by reference herein in their entirety.

BACKGROUND OF THE INVENTION

Field of the Invention

The present invention relates to wireless communications, and more particularly, to a method for a device-to-device (D2D) operation performed by a terminal in a wireless communication system, and the terminal using the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, 3rd Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D2D) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

There is a need to regulate which scheme a network configures resources used to perform a D2D operation and how to use configured resources to perform the D2D operation by a terminal.

SUMMARY OF THE INVENTION

The present invention provides a method for a device-to-device (D2D) operation performed by a terminal in a wireless communication system, and the terminal using the method.

In one aspect, provided is a device-to-device (D2D) operation method performed by a first terminal in a wireless communication system. The D2D operation method includes receiving D2D configuration information from a plurality of resources which can be used for a D2D operation from a network, selecting a specific resource from the plurality of resources and performing the D2D operation with another terminal using the selected specific resource. The specific resource is selected based on a reference signal received power (RSRP) which the terminal has received from the network.

In another aspect, provided is a terminal for performing a D2D operation in a wireless communication system. The terminal includes a RF unit configured to send and receive radio signals and a processor connected to the RF unit to be operated. The processor receives D2D configuration information from a plurality of resources which can be used for a D2D operation from a network, selects a specific resource from the plurality of resources and performs the D2D operation with another terminal using the selected specific resource. The specific resource is selected based on a reference signal received power (RSRP) which the terminal has received from the network.

The UE may select a suitable D2D resource from a plurality of D2D resources based on reception power of a reference signal. That is, the UE may recognize a location thereof related to coverage of a cell to select a corresponding D2D resource.

DESCRIPTION OF EXEMPLARY EMBODIMENTS

Figure 1:
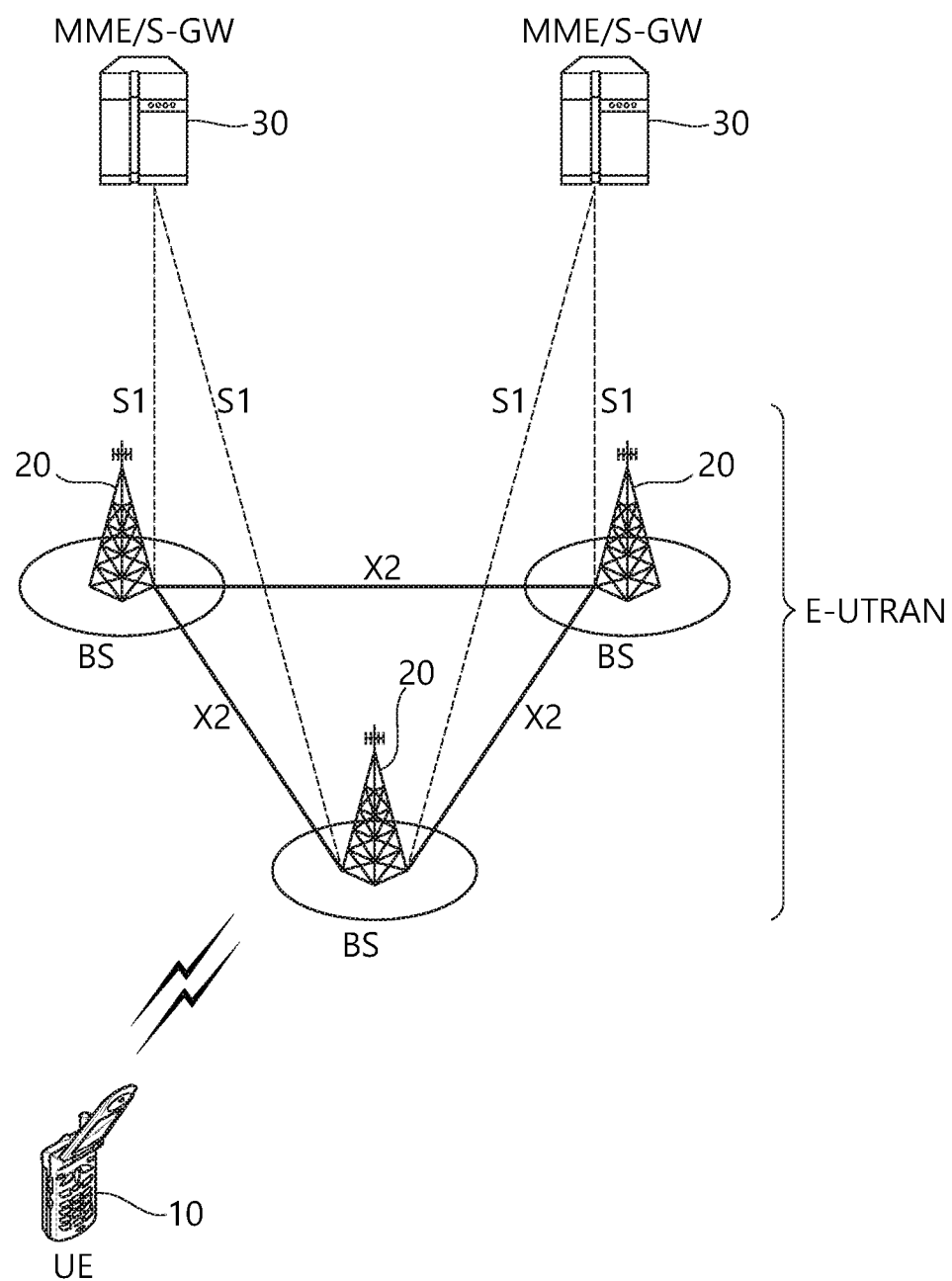
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
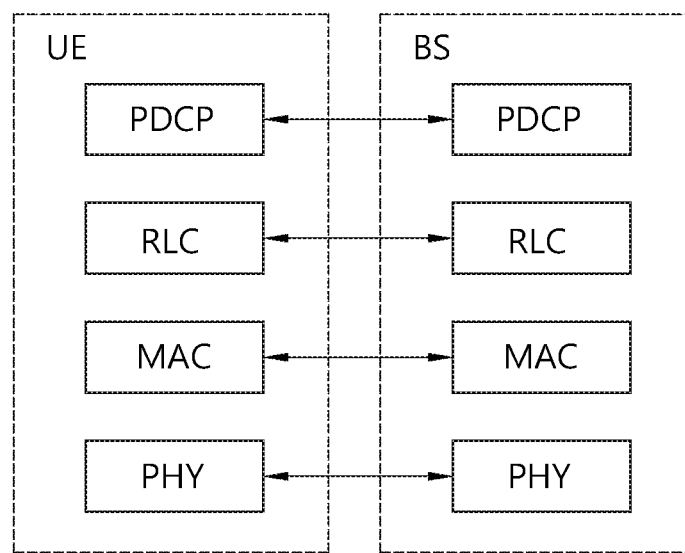
FIG. 2 is a diagram showing a wireless protocol architecture for a user plane.
Figure 3:
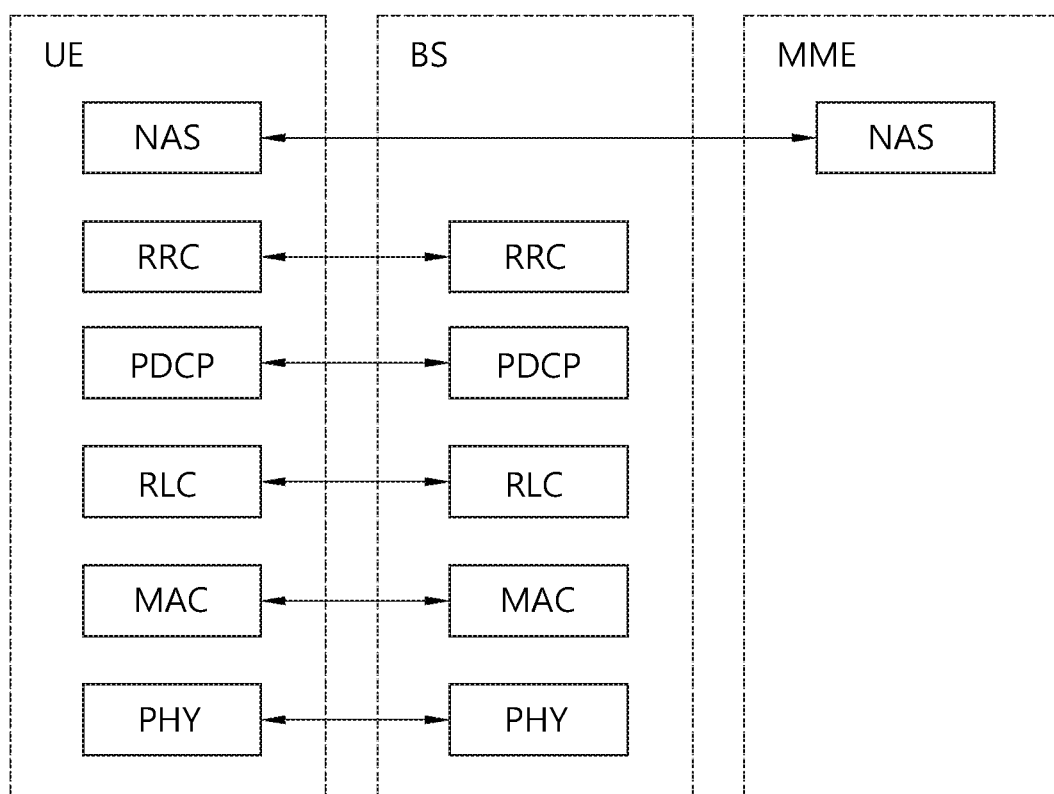
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include the limited number of parameters which are the most essential and are most frequently transmitted in order to obtain other information from a cell. UE first discovers an MIB after downlink synchronization. The MIB may include information, such as a downlink channel bandwidth, a PHICH configuration, an SFN supporting synchronization and operating as a timing reference, and an eNB transmission antenna configuration. The MIB may be broadcasted on a BCH.

SystemInformationBlockType1 (SIB1) of included SIBs is included in a "SystemInformationBlockType1" message and transmitted. Other SIBs other than the SIB1 are included in a system information message and transmitted. The mapping of the SIBs to the system information message may be flexibly configured by a scheduling information list parameter included in the SIB1. In this case, each SIB is included in a single system information message. Only SIBs having the same scheduling required value (e.g. period) may be mapped to the same system information message. Furthermore, SystemInformationBlockType2 (SIB2) is always mapped to a system information message corresponding to the first entry within the system information message list of a scheduling information list. A plurality of system information messages may be transmitted within the same period. The SIB1 and all of the system information messages are transmitted on a DL-SCH.

In addition to broadcast transmission, in the E-UTRAN, the SIB1 may be channel-dedicated signaling including a parameter set to have the same value as an existing set value. In this case, the SIB1 may be included in an RRC connection re-establishment message and transmitted.

The SIB1 includes information related to UE cell access and defines the scheduling of other SIBs. The SIB1 may include information related to the PLMN identifiers, Tracking Area Code (TAC), and cell ID of a network, a cell barring state indicative of whether a cell is a cell on which UE can camp, a required minimum reception level within a cell which is used as a cell reselection reference, and the transmission time and period of other SIBs.

The SIB2 may include radio resource configuration information common to all types of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and for detecting a change of system information to only a PCell. In an SCell, when the corresponding SCell is added, the E-UTRAN may provide all types of system information related to an RRC connection state operation through dedicated signaling. When system information related to a configured SCell is changed, the E-UTRAN may release a considered SCell and add the considered SCell later. This may be performed along with a single RRC connection re-establishment message. The E-UTRAN may set a value broadcast within a considered SCell and other parameter value through dedicated signaling.

UE needs to guarantee the validity of a specific type of system information. Such system information is called required system information. The required system information may be defined as follows.

If UE is in the RRC_IDLE state: the UE needs to have the valid version of the MIB and the SIB1 in addition to the SIB2 to SIB8. This may comply with the support of a considered RAT.

If UE is in the RRC connection state: the UE needs to have the valid version of the MIB, SIB1, and SIB2.

In general, the validity of system information may be guaranteed up to a maximum of 3 hours after being obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
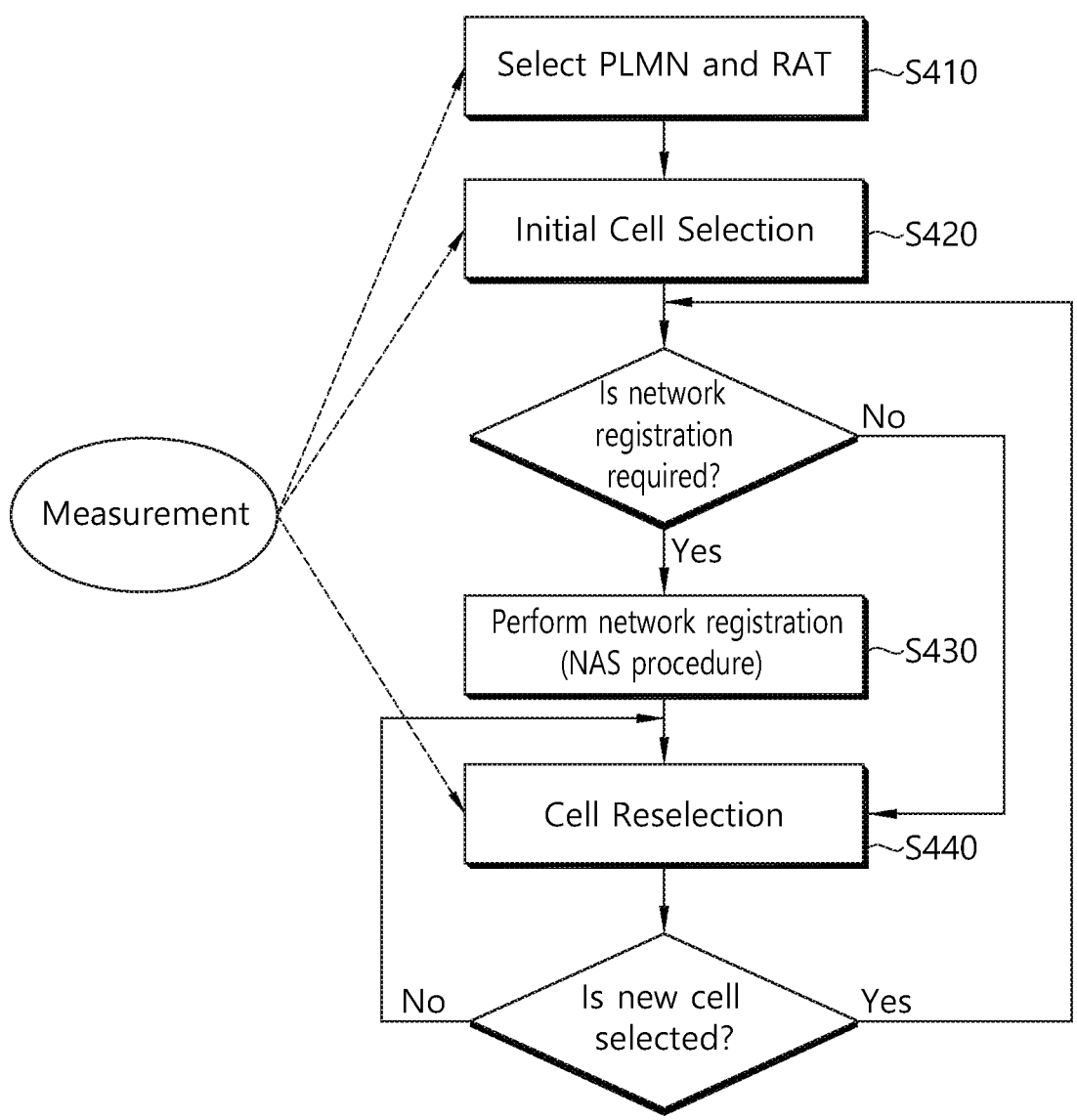
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
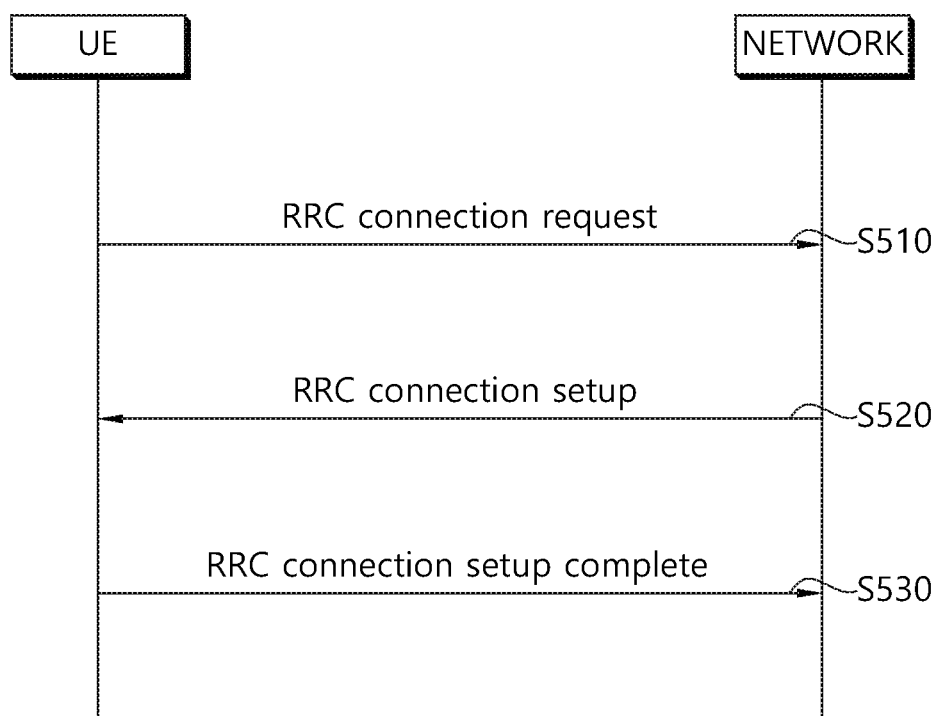
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
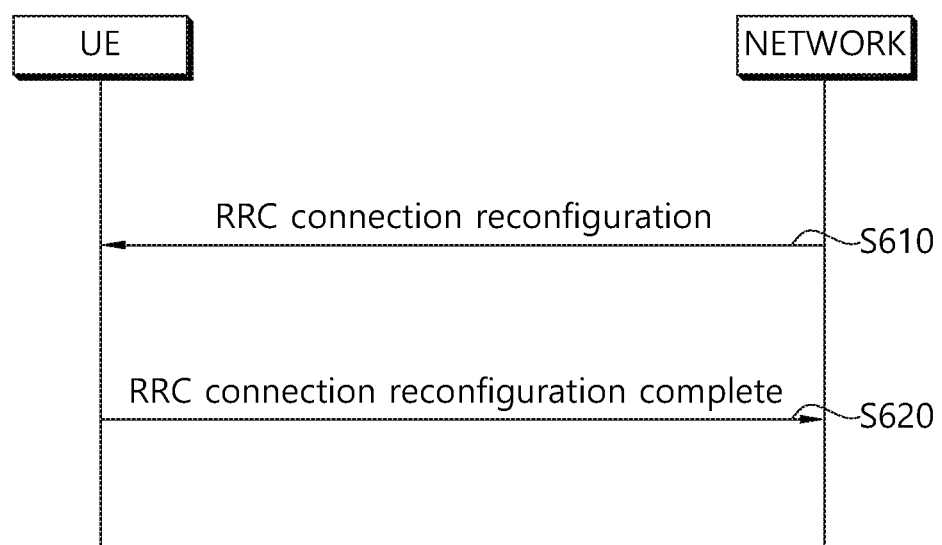
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC).

Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009 March) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

The cell selection criterion may be defined as below equation 1.

$$\text{Srxlev} > 0 \text{ AND Squal} > 0 \qquad \text{[Equation 1]}$$

where:

$$\text{Srxlev} = Q_{rxlevmeas} - (Q_{rxlevmin} + Q_{rxlevminoffset}) - P_{compensation}$$

$$\text{Squal} = Q_{qualmeas} - (Q_{qualmin} + Q_{qualminoffset})$$

Here, the variables in the equation 1 may be defined as below table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signalled values, i.e., $Q_{rxlevminoffset}$ and $Q_{qualminoffset}$, may be applied to a case where cell selection is evaluated as a result of periodic search for a higher priority PLMN during a UE camps on a normal cell in a VPLMN. During the periodic search for the higher priority PLMN as described above, the UE may perform the cell selection evaluation by using parameter values stored in other cells of the higher priority PLMN.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$Rs = Q\text{meas},s + Q\text{hyst}, Rn = Q\text{meas},s - Q\text{offset} \quad \text{[Equation 2]}$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
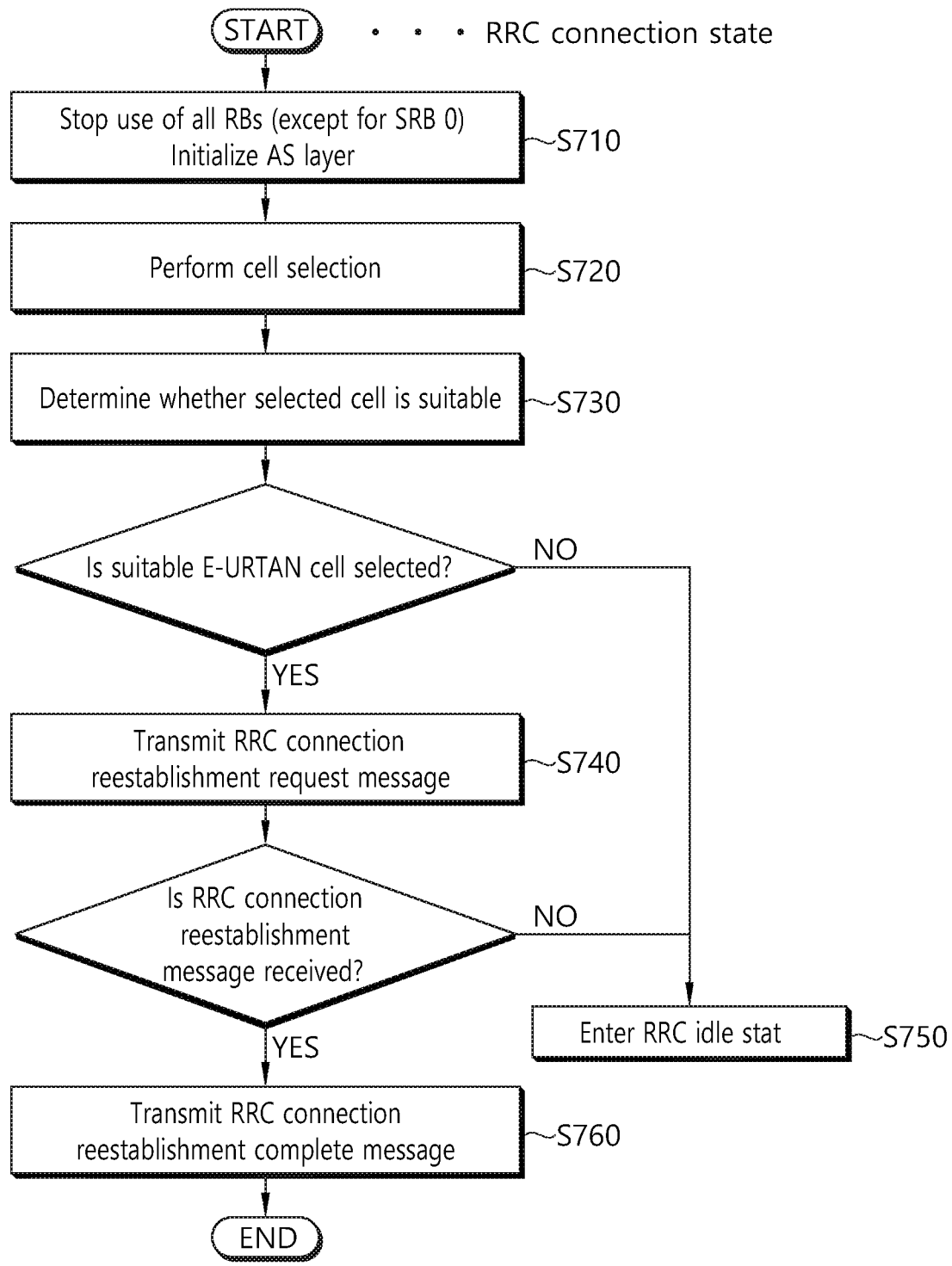
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
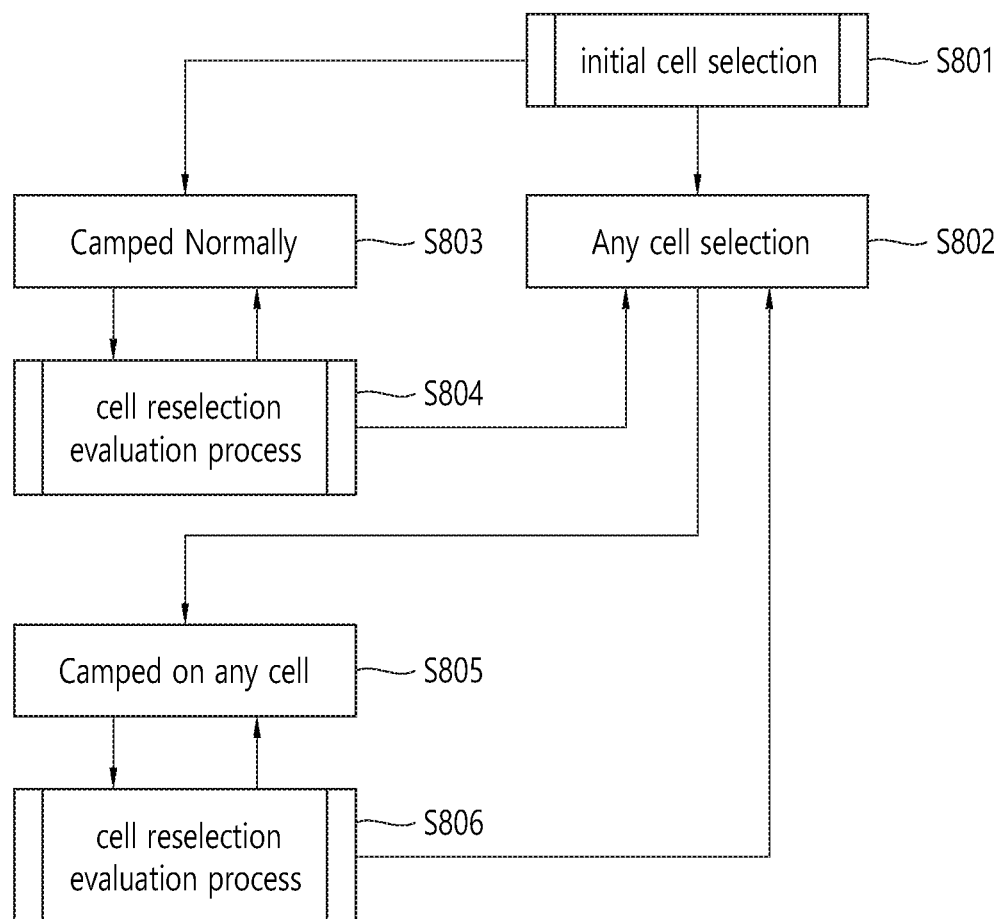
FIG. 8 illustrates substates which may be owned by UE in the RRC_IDLE state and a substate transition process.

FIG. 8 illustrates substates which may be owned by UE in the RRC_IDLE state and a substate transition process.

Referring to FIG. 8, UE performs an initial cell selection process (S801). The initial cell selection process may be performed when there is no cell information stored with respect to a PLMN or if a suitable cell is not discovered.

If a suitable cell is unable to be discovered in the initial cell selection process, the UE transits to any cell selection state (S802). The any cell selection state is the state in which the UE has not camped on a suitable cell and an acceptable cell and is the state in which the UE attempts to discover an acceptable cell of a specific PLMN on which the UE may camp. If the UE has not discovered any cell on which it may camp, the UE continues to stay in the any cell selection state until it discovers an acceptable cell.

If a suitable cell is discovered in the initial cell selection process, the UE transits to a normal camp state (S803). The normal camp state refers to the state in which the UE has camped on the suitable cell. In this state, the UE may select and monitor a paging channel based on information provided through system information and may perform an evaluation process for cell reselection.

If a cell reselection evaluation process (S804) is caused in the normal camp state (S803), the UE performs a cell reselection evaluation process (S804). If a suitable cell is discovered in the cell reselection evaluation process (S804), the UE transits to the normal camp state (S803) again.

If an acceptable cell is discovered in the any cell selection state (S802), the UE transmits to any cell camp state (S805). The any cell camp state is the state in which the UE has camped on the acceptable cell.

In the any cell camp state (S805), the UE may select and monitor a paging channel based on information provided through system information and may perform the evaluation process (S806) for cell reselection. If an acceptable cell is not discovered in the evaluation process (S806) for cell reselection, the UE transits to the any cell selection state (S802).

Now, a device-to-device (D2D) operation is described. In 3GPP LTE-A, a service related to the D2D operation is called a proximity service (ProSe). Now, the ProSe is described. Hereinafter, the ProSe is the same concept as the D2D operation, and the ProSe and the D2D operation may be used without distinction.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 9:
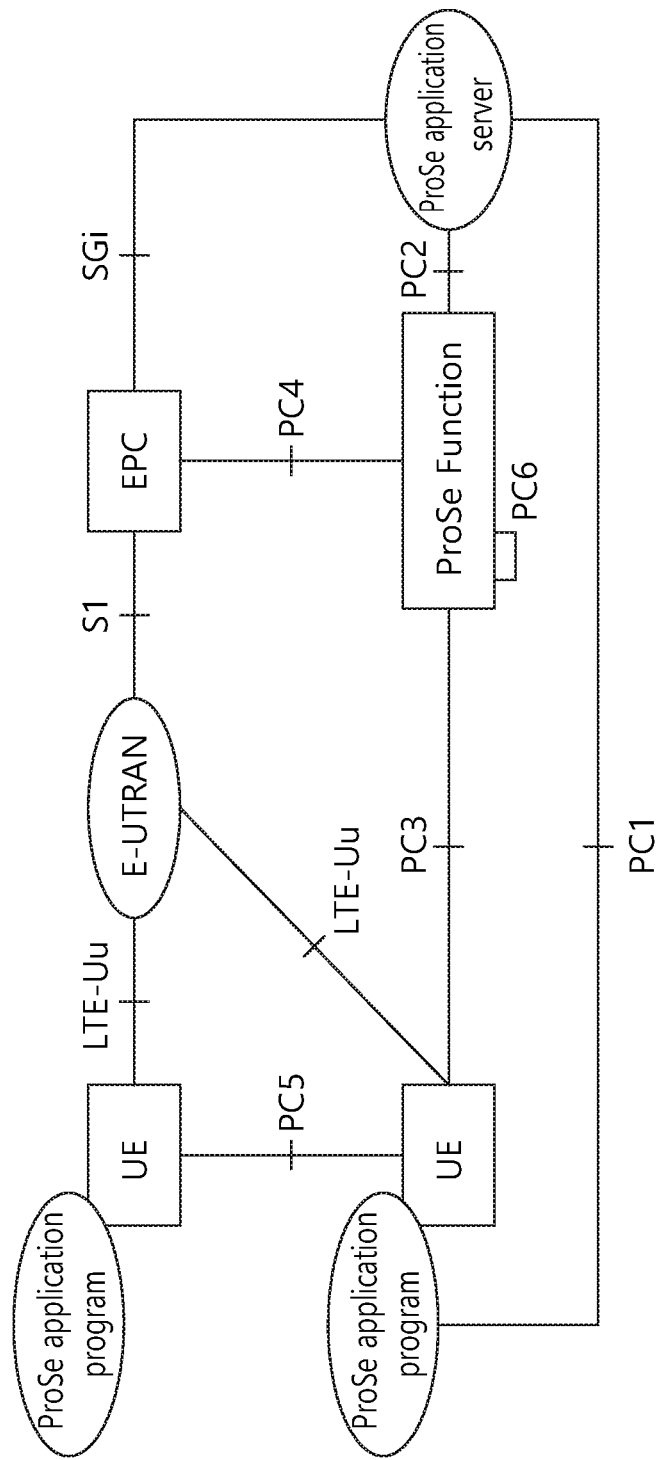
FIG. 9 shows a basic structure for ProSe.

FIG. 9 shows a basic structure for ProSe.

Referring to FIG. 9, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications

Authorization and configuration of UE for discovery and direct communication

Enable the functionality of EPC level ProSe discovery

ProSe related new subscriber data and handling of data storage, and also handling of the ProSe identities Security related functionality Provide control towards the EPC for policy related functionality Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

<ProSe Direct Communication>

ProSe direct communication is communication mode in which two types of public safety UE can perform direct communication through a PC 5 interface. Such communication mode may be supported when UE is supplied with services within coverage of an E-UTRAN or when UE deviates from coverage of an E-UTRAN.

Figure 10:
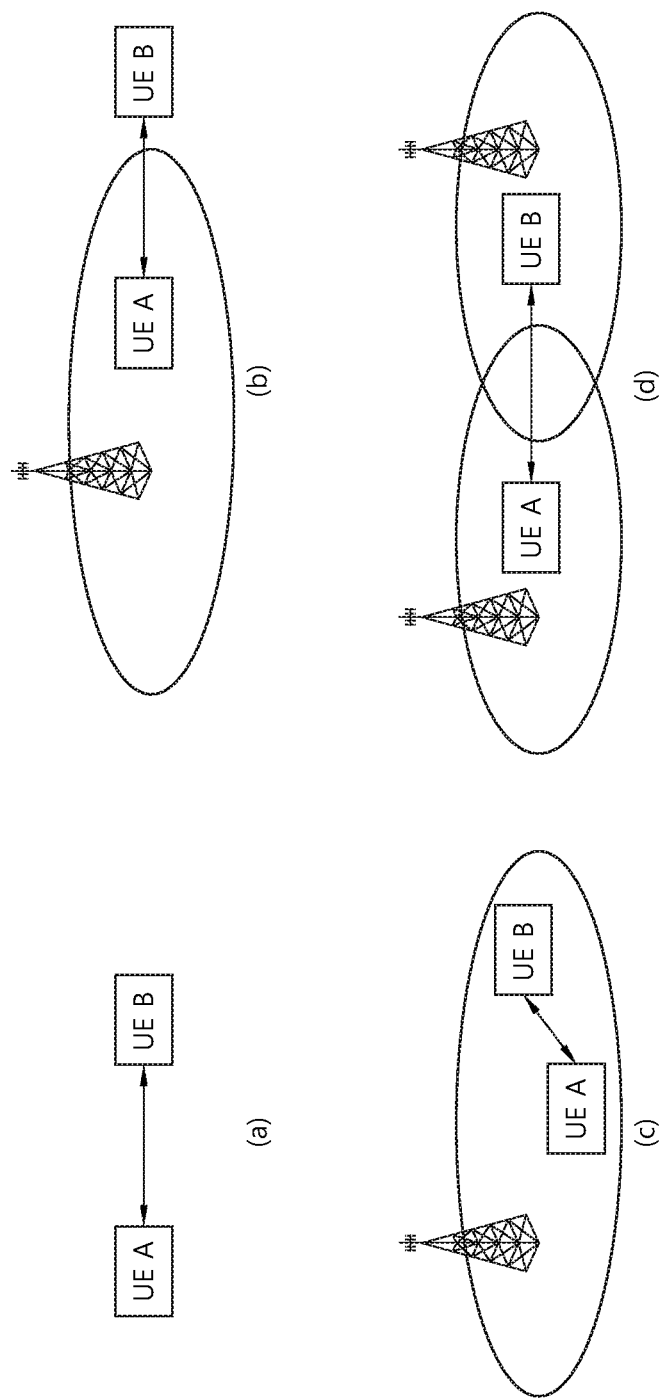
FIG. 10 shows the deployment examples of types of UE performing ProSe direct communication and cell coverage.

FIG. 10 shows the deployment examples of types of UE performing ProSe direct communication and cell coverage.

Referring to FIG. 10(a), types of UE A and B may be placed outside cell coverage. Referring to FIG. 10(b), UE A may be placed within cell coverage, and UE B may be placed outside cell coverage. Referring to FIG. 10(c), types of UE A and B may be placed within single cell coverage. Referring to FIG. 10(d), UE A may be placed within coverage of a first cell, and UE B may be placed within coverage of a second cell.

ProSe direct communication may be performed between types of UE placed at various positions as in FIG. 10.

Meanwhile, the following IDs may be used in ProSe direct communication.

A source layer-2 ID: this ID identifies the sender of a packet in the PC 5 interface.

A destination layer-2 ID: this ID identifies the target of a packet in the PC 5 interface.

An SA L1 ID: this ID is the ID of scheduling assignment (SA) in the PC 5 interface.

Figure 11:
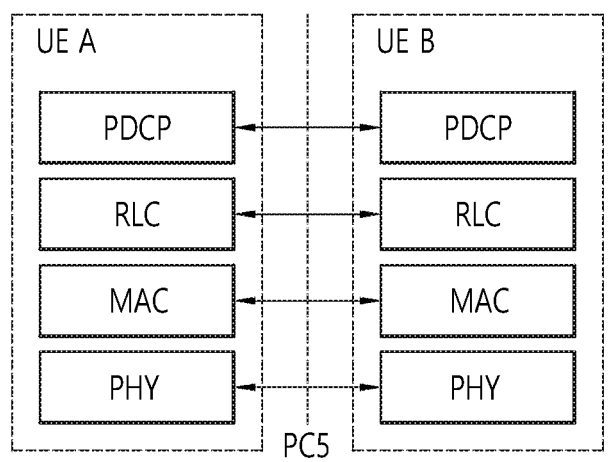
FIG. 11 shows a user plane protocol stack for ProSe direct communication.

FIG. 11 shows a user plane protocol stack for ProSe direct communication.

Referring to FIG. 11, the PC 5 interface includes a PDCH, RLC, MAC, and PHY layers.

In ProSe direct communication, HARQ feedback may not be present. An MAC header may include a source layer-2 ID and a destination layer-2 ID.

<Radio Resource Assignment for ProSe Direct Communication>

ProSe-enabled UE may use the following two types of mode for resource assignment for ProSe direct communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<ProSe Direct Discovery>

ProSe direct discovery refers to a procedure that is used for ProSe-enabled UE to discover another ProSe-enabled UE in proximity and is also called D2D direct discovery. In this case, E-UTRA radio signals through the PC 5 interface may be used. Information used in ProSe direct discovery is hereinafter called discovery information.

Figure 12:
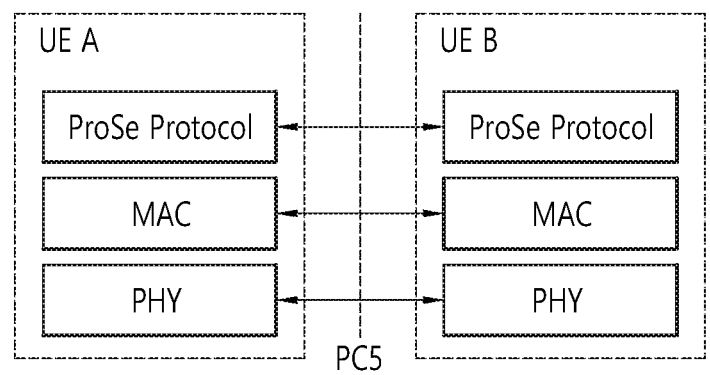
FIG. 12 shows the PC 5 interface for D2D direct discovery.

FIG. 12 shows the PC 5 interface for D2D direct discovery.

Referring to FIG. 12, the PC 5 interface includes an MAC layer, a PHY layer, and a ProSe Protocol layer, that is, a higher layer. The higher layer (the ProSe Protocol) handles the permission of the announcement and monitoring of a discovery information. The contents of the discovery information are transparent to an access stratum (AS). The ProSe Protocol transfers only valid discovery information to the AS for announcement.

The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be signaled through the SIB.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner. UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Figure 13:
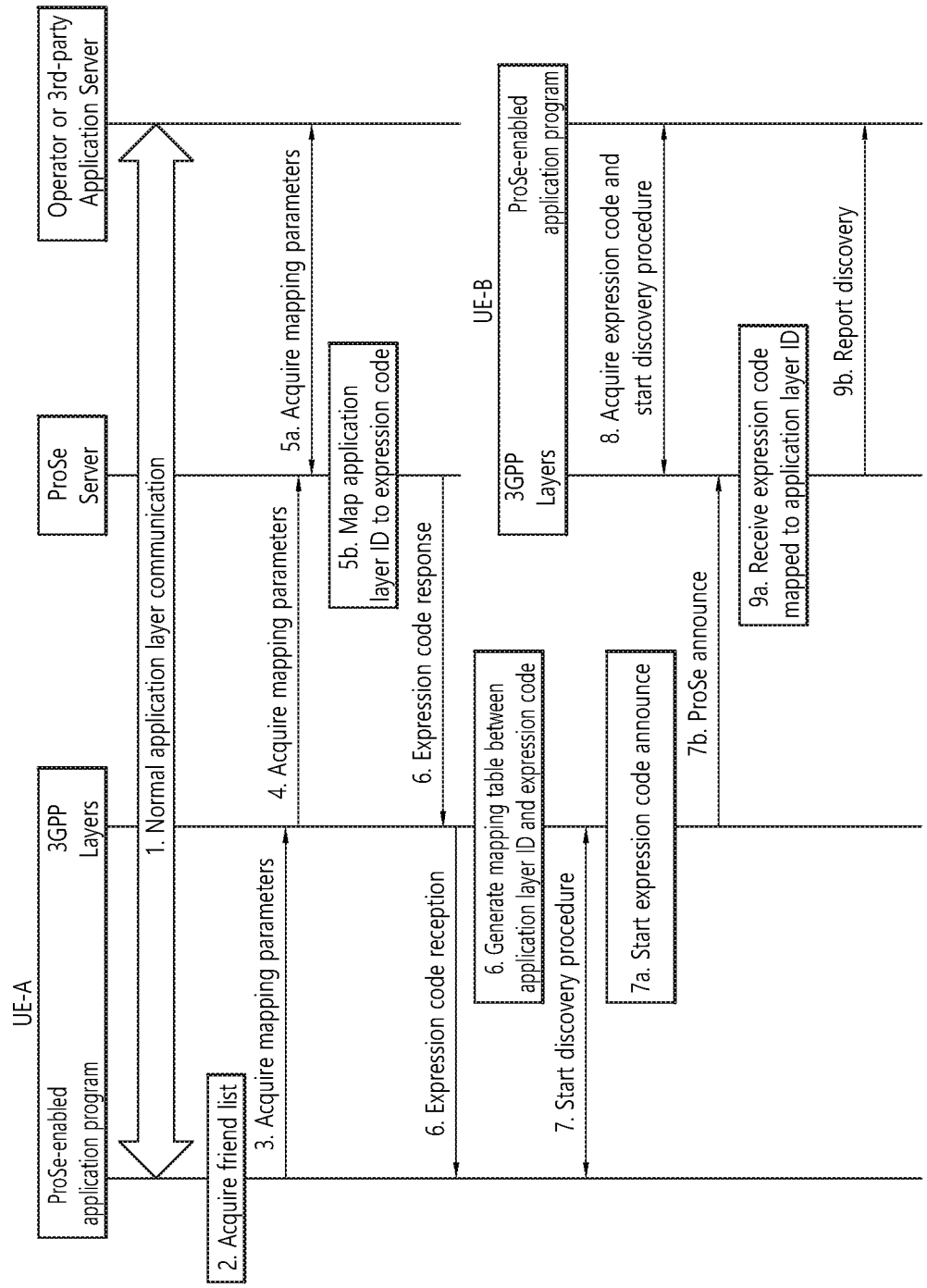
FIG. 13 is an embodiment of a ProSe discovery process.

FIG. 13 is an embodiment of a ProSe discovery process.

Referring to FIG. 13, it is assumed that UE A and UE B have ProSe-enabled application programs managed therein and have been configured to have a 'friend' relation between them in the application programs, that is, a relationship in which D2D communication may be permitted between them. Hereinafter, the UE B may be represented as a 'friend' of the UE A. The application program may be, for example, a social networking program. '3GPP Layers' correspond to the functions of an application program for using ProSe discovery service, which have been defined by 3GPP.

Direct discovery between the types of UE A and B may experience the following process.

1. First, the UE A performs regular application layer communication with the APP server. The communication is based on an Application Program Interface (API).

2. The ProSe-enabled application program of the UE A receives a list of application layer IDs having a 'friend' relation. In general, the application layer ID may have a network access ID form. For example, the application layer ID of the UE A may have a form, such as "adam@example.com."

3. The UE A requests private expressions code for the user of the UE A and private representation code for a friend of the user.

4. The 3GPP layers send a representation code request to the ProSe server.

5. The ProSe server maps the application layer IDs, provided by an operator or a third party APP server, to the private representation code. For example, an application layer ID, such as adam@example.com, may be mapped to private representation code, such as "GTER543$#2FSJ67DFSF." Such mapping may be performed based on parameters (e.g., a mapping algorithm, a key value and so on) received from the APP server of a network.

6. The ProSe server sends the types of derived representation code to the 3GPP layers. The 3GPP layers announce the successful reception of the types of representation code for the requested application layer ID to the ProSe-enabled application program. Furthermore, the 3GPP layers generate a mapping table between the application layer ID and the types of representation code.

7. The ProSe-enabled application program requests the 3GPP layers to start a discovery procedure. That is, the ProSe-enabled application program requests the 3GPP layers to start discovery when one of provided 'friends' is placed in proximity to the UE A and direct communication is possible. The 3GPP layers announces the private representation code (i.e., in the above example, "GTER543$#2FSJ67DFSF", that is, the private representation code of adam@example.com) of the UE A. This is hereinafter called 'announcement'. Mapping between the application layer ID of the corresponding application program and the private representation code may be known to only 'friends' which have previously received such a mapping relation, and the 'friends' may perform such mapping.

8. It is assumed that the UE B operates the same ProSe-enabled application program as the UE A and has executed the aforementioned 3 to 6 steps. The 3GPP layers placed in the UE B may execute ProSe discovery.

9. When the UE B receives the aforementioned 'announce' from the UE A, the UE B determines whether the private representation code included in the 'announce' is known to the UE B and whether the private representation code is mapped to the application layer ID. As described the 8 step, since the UE B has also executed the 3 to 6 steps, it is aware of the private representation code, mapping between the private representation code and the application layer ID, and corresponding application program of the UE A. Accordingly, the UE B may discover the UE A from the 'announce' of the UE A. The 3GPP layers announce that adam@example.com has been discovered to the ProSe-enabled application program within the UE B.

In FIG. 13, the discovery procedure has been described by taking into consideration all of the types of UE A and B, the ProSe server, the APP server and so on. From the viewpoint of the operation between the types of UE A and B, the UE A sends (this process may be called announcement) a signal called announcement, and the UE B receives the announce and discovers the UE A. That is, from the aspect that an operation that belongs to operations performed by types of UE and that is directly related to another UE is only step, the discovery process of FIG. 13 may also be called a single step discovery procedure.

Figure 14:
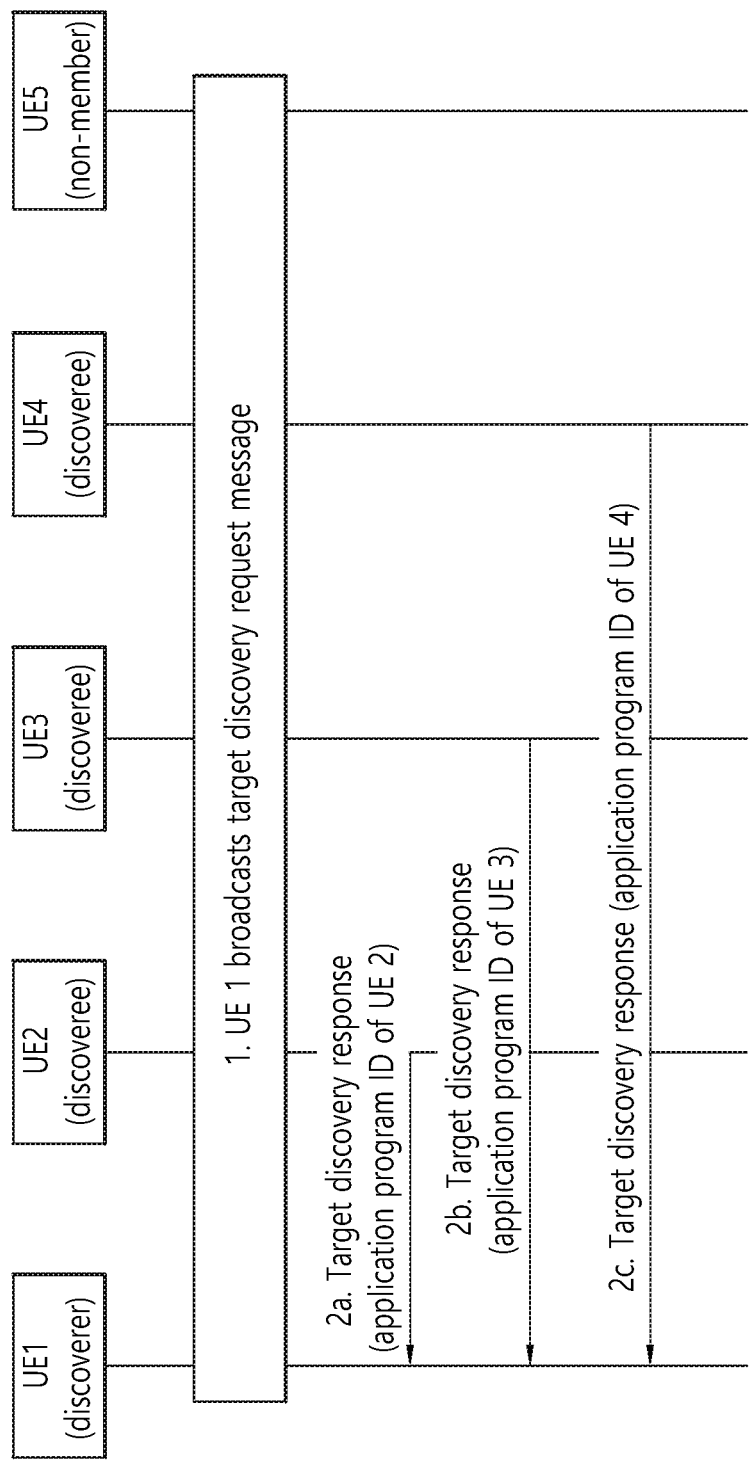
FIG. 14 is another embodiment of a ProSe discovery process.

FIG. 14 is another embodiment of a ProSe discovery process.

In FIG. 14, types of UE 1 to 4 are assumed to types of UE included in specific group communication system enablers (GCSE) group. It is assumed that the UE 1 is a discoverer and the types of UE 2, 3, and 4 are discoveree. UE 5 is UE not related to the discovery process.

The UE 1 and the UE 2-4 may perform a next operation in the discovery process.

First, the UE 1 broadcasts a target discovery request message (may be hereinafter abbreviated as a discovery request message or M1) in order to discover whether specific UE included in the GCSE group is in proximity. The target discovery request message may include the unique application program group ID or layer-2 group ID of the specific GCSE group. Furthermore, the target discovery request message may include the unique ID, that is, application program private ID of the UE 1. The target discovery request message may be received by the types of UE 2, 3, 4, and 5.

The UE 5 sends no response message. In contrast, the types of UE 2, 3, and 4 included in the GCSE group send a target discovery response message (may be hereinafter abbreviated as a discovery response message or M2) as a response to the target discovery request message. The target discovery response message may include the unique application program private ID of UE sending the message.

An operation between types of UE in the ProSe discovery process described with reference to FIG. 14 is described below. The discoverer (the UE 1) sends a target discovery request message and receives a target discovery response message, that is, a response to the target discovery request message. Furthermore, when the discoveree (e.g., the UE 2) receives the target discovery request message, it sends a target discovery response message, that is, a response to the target discovery request message. Accordingly, each of the types of UE performs the operation of the 2 step. In this aspect, the ProSe discovery process of FIG. 14 may be called a 2-step discovery procedure.

In addition to the discovery procedure described in FIG. 14, if the UE 1 (the discoverer) sends a discovery conform message (may be hereinafter abbreviated as an M3), that is, a response to the target discovery response message, this may be called a 3-step discovery procedure.

<Synchronization Signal in D2D Operation>

According to the related art, a synchronization signal is transmitted by a center network node (e.g., base station) using a downlink resource. However, in the D2D operation, the synchronization signal may be transmitted by a terminal. In particular, when the synchronization signal transmitted through a base station is not detected or is too weak to be identified, a synchronization signal may be transmitted by a terminal for the D2D operation between terminals.

That is, an exact reception/decoding of a wireless signal may be possible by adjusting synchronization between terminals performing the D2D operation. The synchronization signal is used to acquire synchronization of a time and a frequency. A network node which is not a base station, for example, a terminal may transmit the synchronization signal in the D2D operation. Hereinafter, unless other defined, the synchronization signal means a synchronization signal in the D2D operation, that is, a synchronization signal transmitted from a network node which is not a base station. Further, hereinafter, the synchronization signal may mean a signal having all or a part of following characteristics.

1) The synchronization signal is regarded to be transmitted by the terminal. 2) If a second terminal receiving a synchronization signal transmitted from the first terminal performs synchronization based on the synchronization signal, the second terminal may adjust synchronization for receiving a D2D signal transmitted from the first terminal and a D2D signal transmitted from a third terminal which is another terminal synchronized based on the synchronization signal. 3) The synchronization signal is transmitted through an uplink channel. 4) The synchronization signal is transmitted through uplink resource/uplink subframe/uplink frequency.

When the terminal provides a specific sequence (refers to synchronization sequence) which may be used as a reference of synchronization to another terminal, the terminal may broadcast information including an indicator indicating whether the terminal is located in network coverage. A terminal receiving the specific sequence may determine whether the specific sequence is a synchronization signal used within the network coverage or a synchronization signal used outside the network coverage.

Meanwhile, if a terminal receives the synchronization signal at time t1, the terminal may transmit a synchronization signal at time t1-t2. In this case, the t2 may have a positive value, a negative value or 0 as offset. A value of the t2 may be regulated as a fixed value, may be set by a network or may be induced from PUSCH transmission timing of a cell to which the terminal belongs.

A synchronization signal used for a D2D operation transmitted from a network node (e.g., terminal) except for a base station may transfer an ID of a subject transmitting the synchronization signal and/or a type of the subject.

The synchronization signal may include a primary synchronization signal and a secondary synchronization signal. The primary synchronization signal may use a Zadoff Chu sequence and the secondary synchronization signal may use an M sequence. The Zadoff Chu sequence includes constant amplitude and zero correlation. The M sequence is a type of a pseudorandom binary sequence.

In a following description, uplink means communication from a terminal to a base station. The network node may represent a terminal, a base station, or both of them. A configuration may signify a rule which is determined by the network or is previously determined in the terminal.

Meanwhile, the terminal for supporting the D2D operation may serve as a relay.

Figure 15:
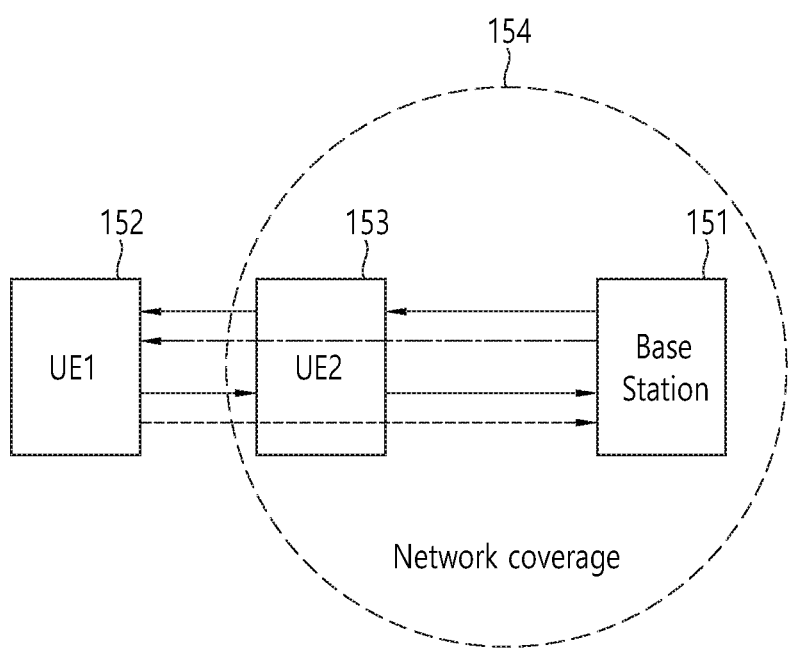
FIG. 15 illustrates a UE-NW relay.

FIG. 15 illustrates a UE-NW relay.

Referring to FIG. 15, a UE 2 153 serves as an UE-NW relay. That is, the UE 2 153 is a network node configured to relay between a UE 1 152 located outside coverage 154 of a network 151 and the network 151. In this case, the UE 2 153 may serve as an UE-NE relay. A D2D operation may be performed between UE 1 152 and the UE 2 153, and existing cellular communication may be performed between the UE 2 153 and the network 151. In FIG. 15, since the UE 1 152 is located outside the network coverage 154, if the UE 2 153 does not provide a relay function, the UE 2 153 may not communicate with the network 151. The UE-NW relay transmits and receives data to and from the UE 1 through D2D communication (D2D operation), and transmits and receives the data to and from the network through general UE-network communication.

Figure 16:
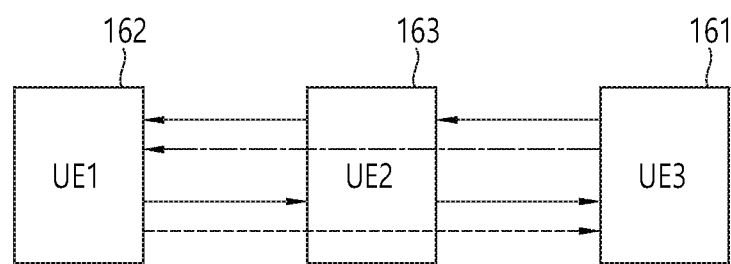
FIG. 16 illustrates a UE-UE relay.

FIG. 16 illustrates a UE-UE relay.

Referring to FIG. 16, a UE 2 163 serves as an UE-UE relay. That is, the UE 2 163 is a network node configured to relay between another UE 161 located outside coverage of a specific UE 162 and the specific UE 162. In this case, the UE 2 163 may serve as an UE-UE relay. In FIG. 16, the UE 1 162 and the UE 3 161 are located outside coverage thereof to each other, if the UE 2 163 does not provide the relay function, the UE 1 162 may not communicate with the UE 3 161. The D2D operation may be performed between the UE 1 162 and the UE 2 163, and between the UE 2 163 and the UE 3 161. The UE-UE relay transmits and receives data to and from the UE 1 through D2D communication (D2D operation), and transmits and receives the data to and from the UE 3 through the D2D communication (D2D operation).

Hereinafter, the present invention will be described. The present invention relates to a D2D operation method performed by a UE how to receive and use a D2D resource during a D2D operation.

Figure 17:
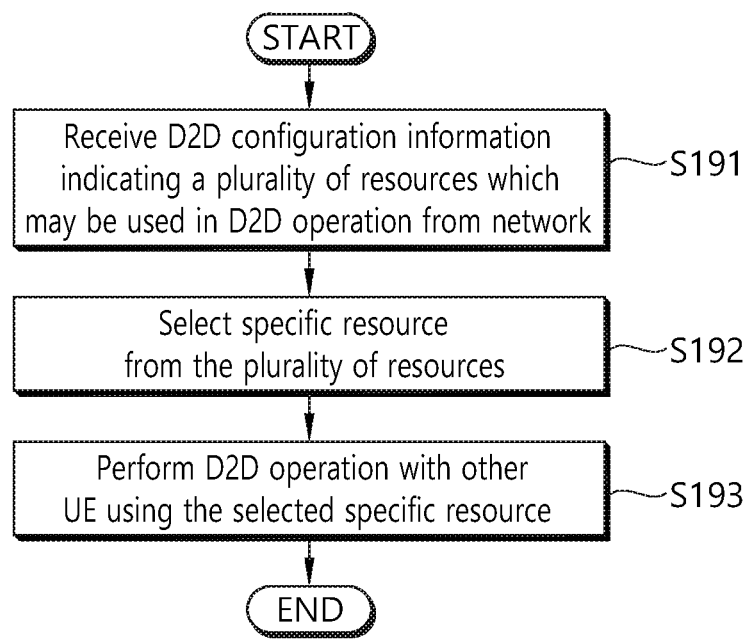
FIG. 17 illustrates a D2D operation method performed by a UE according to an embodiment of the present invention.

FIG. 17 illustrates a D2D operation method performed by a UE according to an embodiment of the present invention.

Referring to FIG. 17, a UE receives D2D configuration information indicating a plurality of resources which may be used in a D2D operation from a network (S191). An individual resource configuring a plurality of resources may be a resource pool. That is, the plurality of resources may be a list of resource pools. D2D configuration information may be provided through broadcasted system information, or may be UE-specifically provided, and may be provided through an RRC message.

The UE selects a specific resource from the plurality of resources (S192). In this case, the UE may select the specific resource based on reference signal received power (RSRP) received from the network.

The UE performs the D2D operation with another UE using the selected specific resource (S193). To select and use the specific resource is exceptional by taking into consideration transmission using only a resource strictly allowed by the network. The above is applicable to the D2D operation. That is, a plurality of resources may include a resource related to D2D transmission.

Hereinafter, respective steps will be described in detail.

Following tables 2 to 5 illustrate detailed examples of D2D configuration information indicating a plurality of resources which may be used in the D2D operation.

TABLE 2

ProseCommConfig information element

```
-- ASN1START
ProseCommConfig-r12 ::=    SEQUENCE        {
     commTxResources-r12                          CHOICE {
         release                                  NULL,
         setup                                    CHOICE {
             scheduled-r12                                SEQUENCE {
             s1-RNTI-r12                          C-RNTI,
             bsr-Config-r12                       ProseBSR-Config-r12,
             commTxConfig-r12                     ProseCommResourcePool-r12,
             mcs-r12                  INTEGER (0..28) OPTIONAL       -- Need OP
             },
             ue-Selected-r12                              SEQUENCE {
                      -- Pool for normal usage
                 commTxPoolNormalDedicated-r12            SEQUENCE {
             poolToReleaseList-r12 ProseTxPoolToReleaseList-r12 OPTIONAL,
         -- Need ON
             poolToAddModList-r12 ProseCommTxPoolToAddModList-r12 OPTIONAL
             -- Need ON
                             }
                     }
             }
     }
     ...                               OPTIONAL,    -- Need ON
}
ProseCommTxPoolToAddModList-r12 ::=               SEQUENCE (SIZE
(1..maxProseTxPool-r12)) OF ProseCommTxPoolToAddMod-r12
ProseCommTxPoolToAddMod-r12 ::=         SEQUENCE      {
     poolIdentity                                 ProseTxPoolIdentity-r12,
     pool-r12                                     ProseCommResourcePool-r12
}
ProseBSR-Config-r12 ::=          SEQUENCE       {
     periodicBSR-Timer                    ENUMERATED {
     sf5, sf10, sf16, sf20, sf32, sf40, sf64, sf80,
     sf128, sf160, sf320, sf640, sf1280, sf2560,
     infinity, spare1},
     retxBSR-Timer                        ENUMERATED {
     sf320, sf640, sf1280, sf2560, sf5120,
     sf10240, spare2, spare1}
}
-- ASN1STOP
```

In the table 2, the 'ProseCommConfig' defines dedicated configuration information for ProSe direct communication: D2D communication), and in particular, is related to transmission resource configuration for D2D communication.

In the table 2, the 'ProseCommResourcePool' may indicate a plurality of resource pools for D2D communication, and may include configuration information for each resource pool. A following table 3 illustrates an example of the 'ProseCommResourcePool'.

TABLE 3

```
-- ASN1START
ProseCommPoolList4-r12 ::=        SEQUENCE (SIZE (1..maxProseTxPool-r12)) OF
ProseComm Resource Pool-r12
ProseCommPoolList16-r12 ::=       SEQUENCE (SIZE (1..maxProseRxPool-r12)) OF
ProseComm Resource Pool-r12
ProseCommResourcePool-r12 ::=     SEQUENCE {
    sc-CP-Len-r12                     Prose-CP-Len-r12,
    sc-Period-r12     ENUMERATED {sf40, sf60, sf70, sf80, sf120, sf140,
                                  sf160, sf20, sf260, sf280, sf320},
    sc-TF-ResourceConfig-r12          Prose-TF-ResourceConfig-r12,
    data-CP-Len-r12                   Prose-CP-Len-r12,
    dataHoppingConfig-r12             Prose-HoppingConfigComm-r12,
    ue-SelectedResourceConfig         SEQUENCE {
    -- Parameters not used in case of scheduled Tx config
        data-TF-ResourceConfig        Prose-TF-ResourceConfig-r12,
        trpt-Subset-r12               BIT STRING (SIZE (3..5))        OPTIONAL   -- Need OR
    }
                                      OPTIONAL,                                  -- Need OR
    rx-ParametersNCell                SEQUENCE {
        tdd-Config-r12                TDD-Config  OPTIONAL,  -- Need OR
        sync-ConfigIndex-r12                      INTEGER (0..15)
    }
                                      OPTIONAL,                                  -- Need OR
    tx-Parameters                     SEQUENCE {
        sc-TxParameters-r12           Prose-TxParameters-r12,
        dataTxParameters-r12          Prose-TxParameters-r12
    }
                                      OPTIONAL,                                  -- Need OR
    ...
}
Prose-CP-Len-r12 ::=              ENUMERATED {normal, extended}
Prose-HoppingConfigComm-r12 ::=   SEQUENCE {
    hopping Parameter-r12             INTEGER (0..504),
    numSubbands-r12                   ENUMERATED {ns1, ns2, ns4},
    rb-Offset-r12                     INTEGER (0..110)
}
-- ASN1STOP
```

In the table 3, the 'ProseCommPoolList4' is a list which includes the number of 'ProseCommResourcePool' corresponding to the number of 'maxProseTxPool', and defines resources with respect to signal transmission related to the D2D communication. The 'ProseCommPoolList16' is a list with the number of 'ProseCommResourcePool' corresponding to the number of 'maxProseRxPool', and defined resources with respect to signal reception related to the D2D communication.

TABLE 4

ProseDiscConfig information element

```
-- ASN1START
ProseDiscConfig-r12 ::=                                       SEQUENCE {
    discTxResources-r12                                           CHOICE {
        release                                                       NULL,
        setup                                         CHOICE {
            scheduled-r12                                             SEQUENCE {
                discTxConfig-r12     ProseDiscResourcePool-r12        OPTIONAL, -- Need ON
                discTF-IndexList-r12 ProseTF-IndexPairList-r12        OPTIONAL, -- Need ON
                discHoppingConfig-r12        ProseHoppingConfigDisc-r12 OPTIONAL  - Need OR
            },
            ue-Selected-r12                                           SEQUENCE {
```

TABLE 4-continued

| ProseDiscConfig information element | | |
|---|---|---|
| discTxPoolDedicated-r12 | | SEQUENCE { |
|     poolToReleaseList-r12 ProseTxPoolToReleaseList-r12 OPTIONAL, | | - |
| -- Need ON | | |
|     poolToAddModList-r12 ProseDiscTxPoolToAddModList-r12 OPTIONAL | | - |
| -- Need ON | | |
|     } | | |
|         OPTIONAL | | -- Need ON |
|     } | | |
|   } | | |
| } | | |
|         OPTIONAL, | | -- Need ON |
| ... | | |
| } | | |
| ProseDiscTxPoolToAddModList-r12 ::= | SEQUENCE (SIZE | |
| (1..maxProseTxPool-r12)) OF ProseDiscTxPoolToAddMod-r12 | | |
| ProseDiscTxPoolToAddMod-r12 ::= | SEQUENCE | { |
|   poolIdentity-r12 | ProseTxPoolIdentity-r12, | |
|   pool-r12 | ProseDiscResourcePool-r12 | |
| } | | |
| ProseTF-IndexPairList-r12 ::= | SEQUENCE (SIZE (1..maxProseTF- | |
| IndexPair-r12)) OF ProseTF-IndexPair-r12 | | |
| ProseTF-IndexPair-r12 ::= | SEQUENCE | { |
|   discSF-Index-r12    INTEGER (1.. 200) | | OPTIONAL, -- Need ON |
|   discPRB-Index-r12  INTEGER (1.. 50) | | OPTIONAL -- Need ON |
| } | | |
| ProseHoppingConfigDisc-r12 ::= | SEQUENCE | { |
|   a-r12 | INTEGER (1..200), | |
|   b-r12 | INTEGER (1..10), | |
|   c-r12 | ENUMERATED {n1, n5} | |
| } | | |
| -- ASN1STOP | | |

The 'ProseDiscConfig' of the table 4 defines dedicated configuration information for ProSe direct discovery (D2D discovery).

In the table 4, the 'ProseDiscResourcePool' may indicate a plurality of resource pools for D2D discovery and may include configuration information for each resource pool. A following table 5 illustrates an example of 'ProseDiscResourcePool'.

TABLE 5

| |
|---|
| -- ASN1START |
| ProseDiscPoolList4-r12 ::=    SEQUENCE (SIZE (1..maxProseTxPool-r12)) OF ProseDiscResourcePool-r12 |
| ProseDiscPoolList16-r12 ::=    SEQUENCE (SIZE (1..maxProseRxPool-r12)) OF ProseDiscResourcePool-r12 |
| ProseDiscResourcePool-r12 ::=    SEQUENCE    { |
|   cp-Len-r12    Prose-CP-Len-r12, |
|   period-r12    ENUMERATED {rf32, rf64, rf128, rf256,rf512,rf1024}, |
|   numRetx-r12    INTEGER (0..3), |
|   numRepetition-r12  INTEGER (1..50)  OPTIONAL,  -- Need OR |
|   tf-ResourceConfig    Prose-TF-ResourceConfig-r12, |
|   tx-Parameters    SEQUENCE { |
|     tx-Parameters    Prose-TxParameters-r12, |
|     ue-SelectedResourceConfig    SEQUENCE { |
|       poolSelection-r12    CHOICE { |
|       rsrpBased-r12  Prose-PoolSelectionConfig-r12, |
|       random-r12  NULL |
|       }, |
|       tx-Probability-r12    ENUMERATED {p25, p50, p75, p100} |
| OPTIONAL  -- Need OR |
|     } |
|         OPTIONAL  -- Need OR |
|   } |
|         OPTIONAL,  -- Need OR |
|   rx-Parameters-r12    SEQUENCE { |
|     tdd-Config-r12  TDD-Config  OPTIONAL,  -- Need OR |
|     sync-ConfigIndex-r12  INTEGER (0..15) |
|   } |
|         OPTIONAL,  -- Need OR |
| ... |

TABLE 5-continued

```
}
Prose-PoolSelectionConfig-r12 ::=    SEQUENCE {
    threshLow-r12                        RSRP-RangeProse10-r12,
    threshHigh-r12                       RSRP-RangeProse10-r12
}
-- ASN1STOP
```

The 'ProseDiscPoolList4' is a list including the number of 'ProseDiscResourcePool' corresponding to the number of 'maxProseTxPool', and defines resources related to transmission of a D2D discovery signal. The ProseDiscPoolList16' is a list including the number of 'ProseDiscResourcePool' corresponding to the number of 'maxProseRxPool', and defines resources related to reception of the D2D discovery signal. Each 'ProseDiscResourcePool' may include a 'period' field indicating a period where a resource pool is repeatedly indicated.

The UE selects a specific resource for the D2D operation from a plurality of resources indicated by D2D configuration information. In this case, the specific resource may be selected in a specific scheme indicated by the D2D configuration information. To this end, the D2D configuration information may include a field indicating a scheme of selecting a resource for the D2D operation by the UE. For example, in the table 5, the 'poolselection' may indicate one of an 'rsrpbased' scheme or a 'random' scheme.

The 'rsrpbased' scheme is a scheme which determines the specific resource based on the RSRP received from the network by the UE. The 'random' scheme is a scheme which selects the specific resource from a plurality of resources by the UE.

The UE may determines whether the UE is located within coverage of the network or outside of the coverage of the network based on the RSRP received from the network.

Meanwhile, the D2D configuration information may include a threshold value with respect to the RSRP. One or more threshold values may be given and may be used as a reference value with respect to the RSRP. For example, the D2D configuration information may include a first threshold value and a second threshold value. The first threshold value may be a low RSRP value THRES_low. The second threshold value may be a high RSRP value THRES_high. The above threshold values may be used to determine which range the UE is located with respect to coverage of a specific cell transmitting the reference signal.

A coverage range of each UE identified according to the threshold value may be related to a specific D2D transmission resource. For example, it is assumed that a coverage range of the UE is divided into three ranges according to a plurality of threshold values. It is assumed that a range 1 means coverage with the highest RSRP, a range 3 means coverage having the lowest RSRP, and a range 2 means coverage having an RSRP higher than that of the range 3 and lower than that of the range 1. Each coverage range may be expressed as a threshold vale set configured by a low threshold value and a high threshold value. Accordingly, the three ranges may be expressed as three sets of threshold values with a low threshold value and a high threshold value. In general, N coverage ranges of threshold values, and each threshold value set may include a high threshold value and a low threshold value. If the high threshold value or the lower threshold value is not signaled, it may be assumed that a RSRP maximum value is a reference value of the high threshold value, and a RSRP minimum value is a reference value of the low threshold value.

In the present invention, it is preferable that the threshold value and the threshold value set are signaled by a related specific resource when it is considered that each threshold value or each threshold value set are related to a specific coverage range and an available specific resource is related in a specific coverage range. That is, when the network configures a plurality of resources, for example, a plurality of resource pools in a UE, as illustrated in a following table, it is preferable to configure a related threshold value and threshold value set with respect to each resource pool.

TABLE 6

```
TX POOL#1
    TX Pool#1 Time Frequency information
    RSRP_THRESHOLD
        THRES_HIGH
        THRES_LOW
...
TX POOL#N
    TX Pool#2 Time Frequency information
    RSRP_THRESHOLD
        THRES_HIGH
        THRES_LOW
```

In another method of signaling the threshold value and the threshold value set, a list having a plurality of threshold values or threshold value sets is signaled in the UE. In this case, information regarding which specific resource is related to a coverage range divided by each threshold value and threshold value set may be configured in the UE as listed in a following table 7.

TABLE 7

```
TX POOL#1
    POOL ID=1
    TX Pool#1 Time Frequency information
...
TX POOL#N
    POOL ID=N
    TX Pool#2 Time Frequency information
RSRP_THRESHOLD#1
    THRES_HIGH
    THRES_LOW
    ASSOCIATED POOL=1
...
RSRP_THRESHOLD#N
    THRES_HIGH
    THRES_LOW
    ASSOCIATED POOL=N
```

The UE may perform a D2D operation with other UE using a selected specific resource. In this case, the D2D operation may include one of the above D2D discovery and D2D communication.

The UE may perform the D2D operation using a resource identified inside and outside the network coverage (cell coverage).

Hereinafter, a situation according to the present invention and a detailed applied example there will be described.

When the UE is served within the network coverage (that is, when the UE is in a RRC_CONNECTED mode or an RRC_IDLE mode), it is not preferable to use a resource for a purpose which is not authenticated. That is because use of the resource may degrade the performance of the whole system and cause violation of laws/rules.

This is the same in the D2D operation. That is, when the UE performs the D2D operation, the UE should select a resource in an authenticated resource (resource pool, hereinafter referred to as 'D2D resource'). Theoretically, all cells may have a D2D resource for the D2D operation. Further, the UE requires to include information on a D2D resource in an idle mode. Accordingly, D2D configuration information reporting a D2D resource for the D2D operation may be broadcasted.

The UE may receive a D2D source pool of a serving cell through broadcasted D2D configuration information. Alternatively, the UE may receive a D2D resource pool of a serving cell through a dedicate signal thereof.

Further, the UE may receive a D2D resource pool of at least one neighboring cell. The UE may receive a D2D resource pool of a neighboring cell through broadcasted configuration information. Alternatively, the UE may receive a D2D resource poll of a neighboring cell through a dedicated signal thereof. The D2D configuration information may indicate a D2D resource pool configured by cells.

Meanwhile, the network may report a D2D resource for a D2D operation of another cell to UEs located within coverage thereof. The above is performed so that the UEs may receive a D2D signal/message provided from another cell. In this case, there may be a problem that the UEs should limit a D2D resource which is used in the D2D operation according to a D2D resource of another cell.

In this case, one of three approaches may be taken into consideration.

1) When a specific resource for D2D transmission is selected, only a D2D resource of a serving cell of the UE may be considered. That is, the UE may not consider a D2D resource of a neighboring cell.

2) When a specific resource for D2D transmission is selected, the UE may consider a D2D resource of a serving cell of the UE and all available D2D resources of neighboring cells.

3) When a specific resource for D2D transmission is selected, the UE may basically consider a D2D resource of a serving cell of the UE and may selectively consider D2D resources of neighboring cells.

Meanwhile, the UE may receive at least one threshold value with respect to signal strength/quality (e.g., RSRP). The UE compares signal strength/quality of a serving cell with the threshold value to determine a range of an RSRP. As a result, the range of an RSRP may represent a geographic range related to cell coverage. That is, a great RSRP means that the probability of the UE to be located at a center of the cell coverage is great. A small RSRP means that the probability of the UE to be located outside the cell coverage is great. Accordingly, a geographic range may be identified according to a value of the RSRP.

Figure 18:
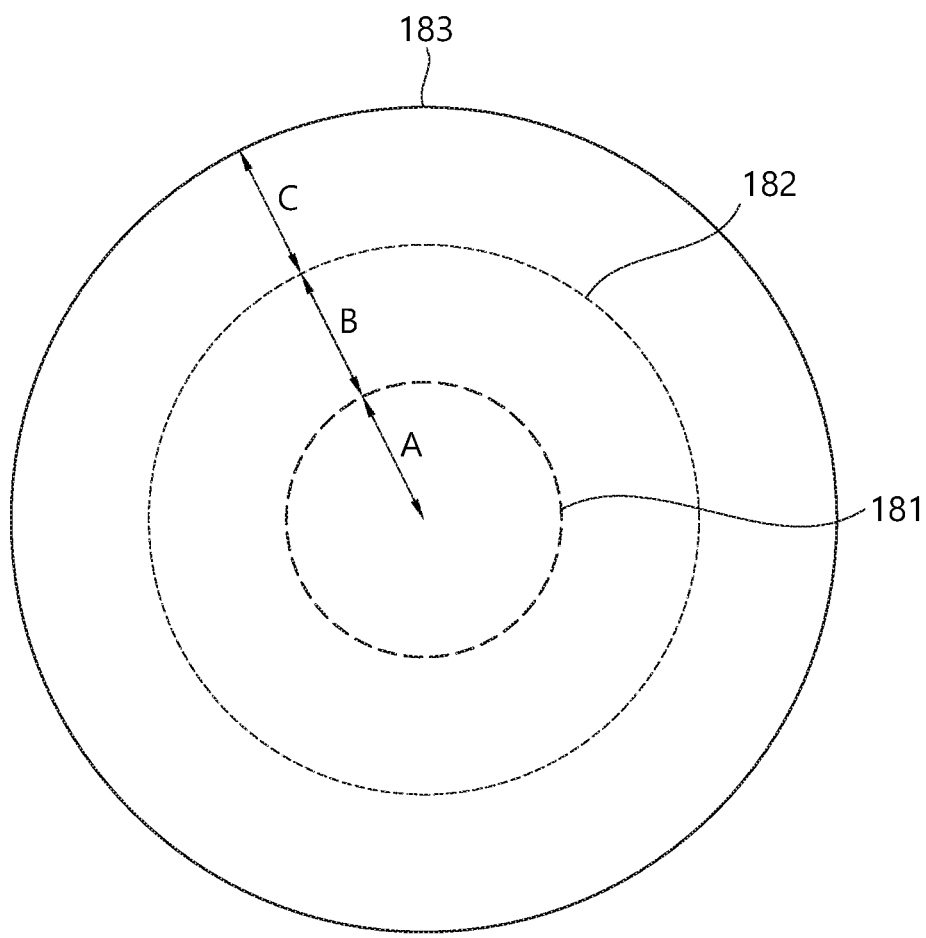
FIG. 18 illustrates cell coverage according to the range of the RSRP.

FIG. 18 illustrates cell coverage according to the range of the RSRP.

Referring to FIG. 18, a range A 181, a range B 182, and a range C 183 may be determined according to the value of the RSRP. The range A 181 may be a region where the value of the RSRP is greater than a first threshold value. A region between the range A 181 and the range B 182 may be a region where the value of the RSRP is less than the first threshold value and greater than a second threshold value (first threshold value>second threshold value). An outside of the range B 182 may be a region where the value of the RSRP is less than the second threshold value. A region having the value of the RSRP less than the second threshold value may be regarded as an outside of the cell coverage.

That is, the network may provide a plurality of threshold values so that coverage of a serving cell may be divided into a plurality of ranges. Two continuous ranges may be divided based on a reference value.

Meanwhile, the network may configure an association relationship between the range of the RSRP and a tier and an association relationship between the tier and a cell through D2D configuration information. Since each cell has a D2D resource thereof, the network associates the range of a RSRP with a D2D resource of each cell through a tier.

For example, a network may provide two threshold values with respect to a cell #1 being a serving cell to report an associated tier with respect to three ranges divided according to each threshold value. Further, the network may report an associated tier with respect to cells #2 and #3 being a neighboring cell. If a threshold value is provided to neighboring cells #2 and #3 so that the neighboring cells #2 and #3 may be divided into a plurality of ranges to report a tier associated with the divided ranges, respectively. D2D resources are configured in the neighboring cells #2 and #3, respectively, and the D2D resources may be associated with the tier.

The UE measures a reference signal of a serving cell to obtain an RSRP, and compares the RSRP with a threshold value to determine in which range of a serving cell the UE is included. In addition, a tier associated with the obtained range is determined using D2D configuration information. Accordingly, the UE may know a range in the serving cell in which the UE is included and a tier. Next, when the UE determines a D2D resource for the D2D operation, the UE takes into consideration only a D2D resource of a neighboring cell associated with the tier.

That is, when the UE selects a specific resource for D2D transmission, the UE may recognize a range of the RSRP to take into consideration a D2D resource associated with the range of the RSRP. In this case, consideration of the D2D resource may means that only the resource is regarded as a candidate resource for D2D transmission.

In FIG. 18, if the UE is located at the range A, the UE takes into consideration a D2D resource associated with the range A as a resource (resource pool) for the D2D operation. If the UE is located at the range B, the UE takes into consideration a D2D resource associated with the range B as the resource (resource pool) for the D2D operation. In the same manner, if the UE is located at the range C, the UE takes into consideration a D2D resource associated with the range C as the resource (resource pool) for the D2D operation.

It is assumed that the range A is associated with a tier 0, the range B is associated with tiers 0 and 1, the range C is associated with 0, 1, and 2, a service cell (refer to cell 0) is associated with a tier 0, neighboring cells 1, 2, 3, 4, and 5 are associated with the tier 1, and neighboring cells 6 to 11 are associated with the tier 2.

In this case, the UE may select a specific resource for the D2D operation, a UE located in a range A by taking into consideration a D2D resource of a cell 0, a UE located in a range B by taking into consideration a D2D resource of cells 0 to 5, and a UE located in a range C by taking into consideration a D2D resource of cells 0 to 11 as an example of selecting a D2D resource to be used in each range. As an example of a method of selecting a resource to be used in a real D2D operation by the UE by taking into consideration one or more associated D2D resource, when a corresponding D2D operation is transmission, the UE performs D2D transmission using an intersection of the one or more associated D2D resource. When a corresponding D2D operation is reception, the UE performs D2D reception using a union of the one or more associated D2D resources. It is assumed in the above example that the UE receives signaling of information on a D2D resource of an associated cell from the network.

As another example of selecting a D2D resource to be used in each range by the UE, a UE located in the range A may select a D2D resource configured in the UE by taking into consideration a cell 0, a UE located in the range B may select a D2D resource configured in the UE by taking into consideration cells 0 to 5, and a UE located in the range C may select a D2D resource configured in the UE by taking into consideration cells 0 to 11. In the example, the UE does not need to signal cell information associated with each coverage range in the UE. The network needs to signal only D2D resource information associated with a corresponding range in the UE.

That is, cells may be grouped through a tier. Each group may be associated with at least one RSRP range. When the UE performs a D2D operation based on a serving cell, the UE may identify a RSRP range (accordingly a located range of the UE) through measurement of a serving cell. When the UE performs the D2D operation based on a cell which is not the serving cell, the UE identifies a RSRP range (accordingly a located range of the UE) through measurement of a reference cell to select a D2D resource to be used by the UE.

Meanwhile, when a D2D resource is selected for D2D transmission, the UE may take into consideration a D2D resource of a serving cell or a D2D resource which is not associated with the serving cell. That is, the UE may take into consideration a D2D resource of the serving cell or a D2D resource of a virtual cell which is absent.

A network may configure an association relationship between a range of a RSRP and a tier and an association relationship between the tier and a cell. In this case, each cell may include a serving cell and a virtual cell. Moreover, since a D2D resource may be configured in each virtual cell, a range of an RSRP is finally associated with a D2D resource of the serving cell or the virtual cell through a tier.

For example, the network may provide two threshold values with respect to a cell #1 being a serving cell to report a tier associated with three ranges divided by each threshold value. In addition, the network may report an associated tier with respect to a virtual cell. In this case, the virtual cell may indicate coverage outside of the serving cell, and indicates a concept of the virtual cell for convenience. If a threshold value is provided to the virtual cell so that the virtual cell is divided into a plurality of ranges, the network may report a tier associated with the divided ranges, respectively. A D2D resource is configured in the virtual cell. This may be interpreted to indicate that a D2D resource to be used outside the coverage of the serving cell.

The UE measures a reference signal of a serving cell to obtain an RSRP, and compares the obtained RSRP with a threshold value to obtain in which range of the serving cell the UE is included. Moreover, a tier associated with the obtained range is determined using the D2D configuration information. Accordingly, the UE may know a range to which the UE is included and a tier in a serving cell. Next, when the UE determines a D2D resource for the D2D operation, if the UE is included in a specific range of the serving cell and a specific tier associated with the specific range, the UE may take into consideration only a D2D resource of a virtual cell associated with the specific tier. For example, a range of the serving cell is divided into an inside and an outside of the serving cell according to one threshold value. The inside of the serving cell is associated with a tier 0 and the outside of the serving cell is associated with a tier 1. Since a D2D resource is configured with respect to the virtual cell if the outside of the serving cell is a virtual cell, a D2D resource is configured in the outside of the serving cell. If the virtual cell is associated with a tier 1, the UE determines a range based on a RSRP in the serving cell. If the range is determined as the inside of the serving cell, the UE determines a resource to be used in a real D2D operation by taking into consideration only a D2D resource configured in the serving cell. Further, if the range is determined as the outside of the serving cell, the UE determines a resource to be used in a real D2D operation by taking into consideration only a D2D resource of the serving cell associated with a tier 1.

That is, when the UE selects a specific resource for D2D transmission, the UE recognizes a range of an RSRP to take into consideration a D2D resource associated with the range of a RSRP. In this case, the UE takes into consideration a D2D resource of a serving cell or a D2D resource of a virtual cell which is not the serving cell.

Figure 19:
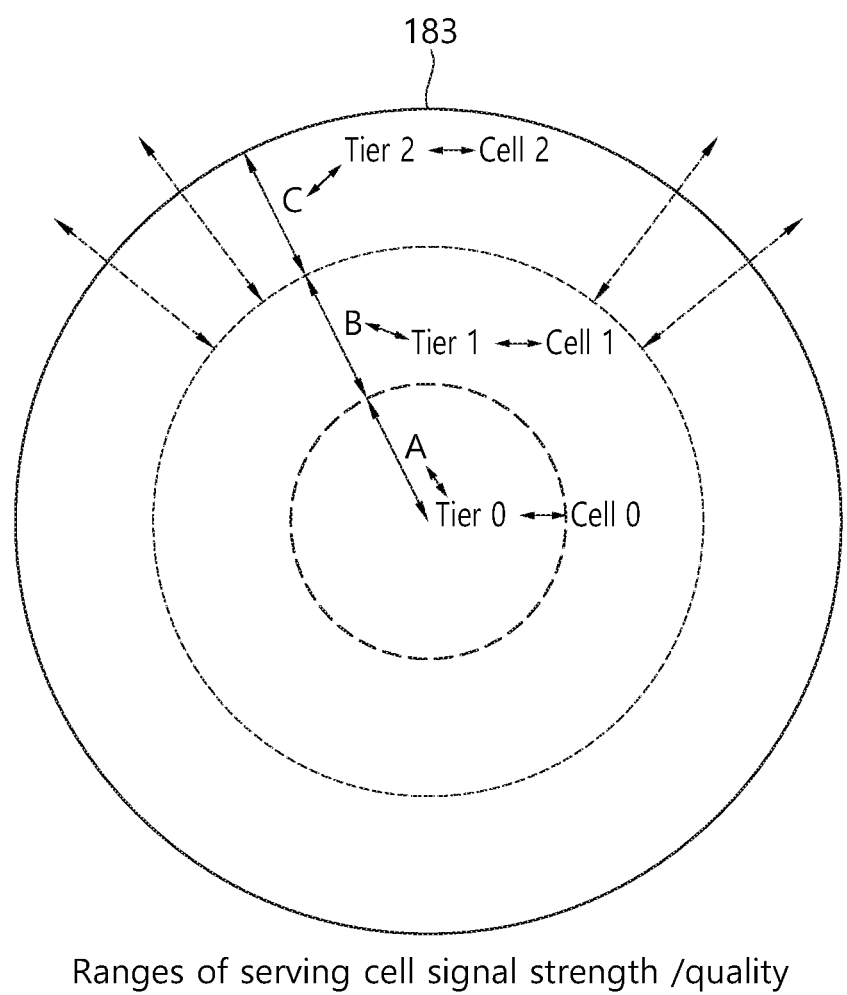
FIG. 19 illustrates the relationship between a range of an RSRP and a tier and the relationship between the tier and a cell.

FIG. 19 illustrates the relationship between a range of an RSRP and a tier and the relationship between the tier and a cell.

Referring to FIG. 19, a range A is associated with a tier 0, and the tier 0 is associated with a cell 0. In this case, the cell 0 may be a serving cell.

A range B is associated with a tier 1 and the tier 1 is associated with a cell 1. The cell 1 is a virtual cell. A range C is associated with a tier 2 and the tier 2 is associated with a cell 2. The cell 2 is also the virtual cell.

Resource pools #0, 1, and 2 are sequentially configured in the cells 0, 1, and 2 as a D2D resource, respectively.

In this case, if the UE is located in the range A, the UE performs a D2D operation using a resource pool #0. If the UE is located in the range B, the UE performs a D2D operation using a resource pool #1. Furthermore, if the UE is located in the range C, the UE performs the D2D operation using a resource pool #2.

That is, when the UE is located within coverage of a reference cell performing D2D, the UE performs a D2D operation using a resource associated with a current coverage range of the reference cell determined by the UE among D2D resources of the reference cell. When the UE is located outside the coverage of a reference cell, the UE performs the D2D operation using a preset different D2D resource. According to the present invention, the above is described by applying a concept of the virtual cell. The UE receives/measures a reference signal from a serving cell to obtain a RSRP value and may know in which range the UE is included. If the measured RSRP value is lower than a specific threshold value, the UE may determine that the coverage is beyond the coverage of the serving cell.

Meanwhile, all cells have the above same threshold value or a serving cell may have a threshold value different from that of a neighboring cell. Further, the threshold value may include a default threshold value. The default threshold value may be the lowest threshold value of the serving cell. If the UE receives the above threshold value, the UE compares a signal strength/quality (RSRP) of a cell with the threshold value. If the measured signal strength/quality of a cell exceeds the threshold value, the UE takes into consideration a D2D resource of the cell. Otherwise, the UE does not take into consideration a D2D resource of the cell. That is, when a specific resource is selected for the D2D operation, a D2D resource of each cell may be considered or not considered as an ON/OFF equation. For example, it is assumed that the UE receives a threshold value with respect to cells #1, #2, and #3. In this case, the 셀 #1 is a serving cell, and the cells #2 and #3 are a neighboring cell. The UE may measure a reference signal with respect to the cells #1, #2, and #3 to obtain an RSRP, and may compare a RSRP with respect to each cell with a received threshold value with respect to each cell. As a result, if only RSRPs of the cells #1 and #2 are greater than corresponding threshold values, the UE takes into consideration only D2D resources of the cells #1 and #2 upon selection of a resource for the D2D operation. That is, a D2D resource of the cell #3 is not considered. That is, when a specific D2D resource is selected for the D2D operation, it is determined whether to use (consider) a D2D resource of each cell according to signal strength/quality and a threshold value of each cell.

The UE is allowed to use a specific resource in a resource defined according to D2D configuration information upon D2D transmission. The UE is not allowed to use a resource except for a resource indicated by D2D configuration information. The UE may know a resource which may have D2D transmission of another UE.

Figure 20:
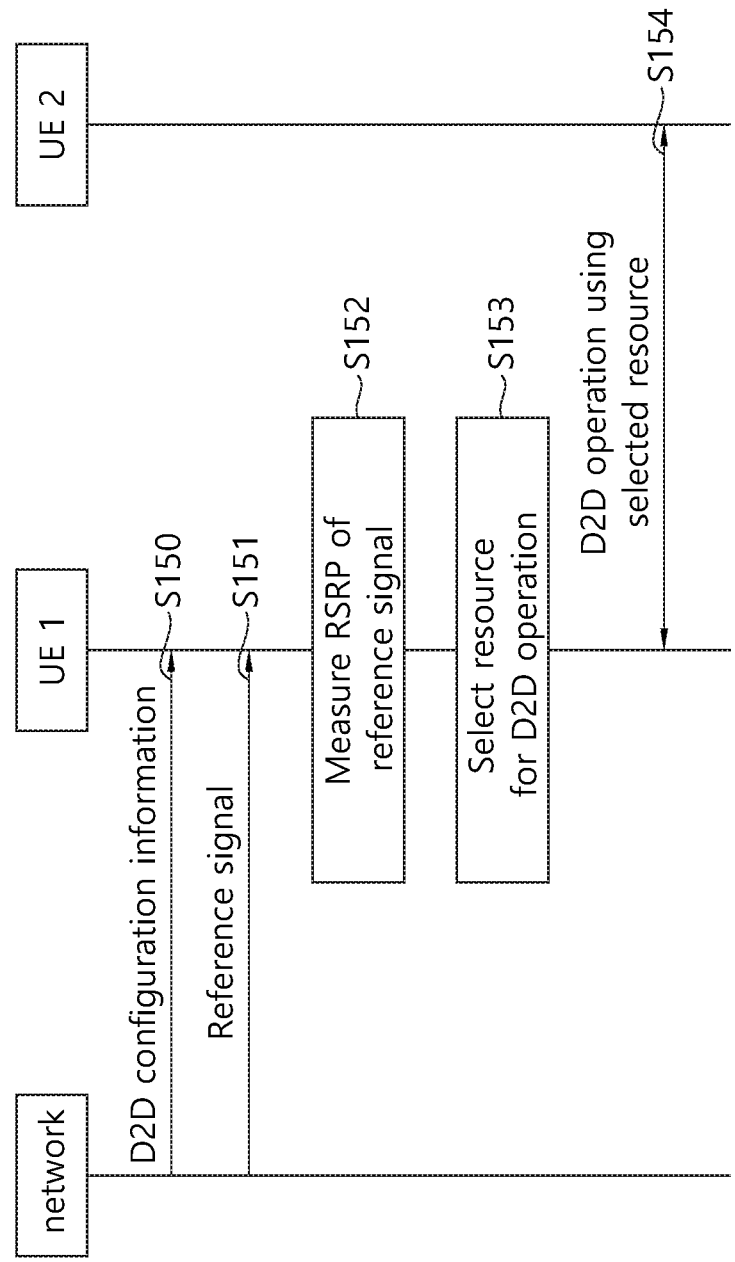
FIG. 20 illustrates an example of applying a method described with reference to FIG. 17 to FIG. 19.

FIG. 20 illustrates an example of applying a method described with reference to FIG. 17 to FIG. 19.

Referring to FIG. 20, a network transmits D2D configuration information to UE 1 (S150). Corresponding D2D configuration information includes information indicating a plurality of D2D resources. For example, the corresponding D2D configuration information may include information indicating a plurality of D2D transmission pools. Moreover, an individual D2D resource, for example, an individual transmission pool may include threshold value information indicating a reception power range (e.g., RSRP) to which a corresponding pool is applicable. Next, the network transmits a reference signal to the UE 1 (S151). The reference signal is a signal for measuring reception quality of a cell to which UEs transmit the reference signal. The UE 1 receives a reference signal to measure reception power RSRP (S152).

The UE 1 selects a resource for the D2D operation (S153). For example, the UE 1 selects a D2D transmission resource (e.g., transmission pool) to which the measured reference signal is applicable.

The UE 1 performs a D2D operation with the UE 2 using the selected resource (S153).

Figure 21:
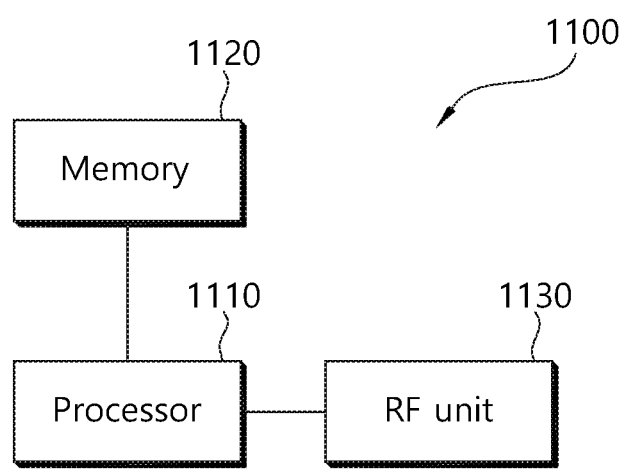
FIG. 21 is a block diagram illustrating a terminal according to an embodiment of the present invention.

FIG. 21 is a block diagram illustrating a terminal according to an embodiment of the present invention.

Referring to FIG. 21, a terminal 1100 includes a processor 1110, a memory 1120, and an RF unit 1130. The processor 1110 performs the proposed functions, processes and/or methods. For example, the processor 1110 receives D2D configuration information indicating a plurality of resources to be used in the D2D operation to select a specific resource from the plurality of resources. In this case, the terminal selects the specific resource based on reception power RSRP of a reference signal received from the network. Next, the processor 1110 performs the D2D operation with another terminal using the selected specific resource.

The RF unit 1130 is connected to the processor 1110 and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for transmitting a device-to-device (D2D) signal in a wireless communication system, the method performed by a user equipment (UE) and comprising:
receiving, from a serving cell, D2D configuration information informing a plurality of resource pools which can be used for transmission of a D2D signal; and
transmitting the D2D signal based on a resource pool among the plurality of resource pools,
wherein the D2D configuration information includes information informing whether the resource pool is selected based on a reference signal received power (RSRP) or is selected randomly,
wherein, based on the resource pool being selected based on the RSRP, the resource pool is a resource pool having a measured RSRP value that is larger than a low threshold value and smaller than a high threshold value, and
wherein the low threshold value and the high threshold value are informed by the D2D configuration information.

2. The method of claim 1, wherein the D2D configuration information informs the low threshold value and the high threshold value such that the UE selects only one resource pool upon the RSRP based pool selection.

3. The method of claim 1, wherein the D2D signal comprises a signal for a D2D discovery.

4. The method of claim 1, wherein the D2D signal comprises a signal for a D2D communication.

5. A user equipment (UE), the UE comprising:
a transceiver configured to transmit and receive radio signals; and
a processor connected to the transceiver to be operated, wherein the processor:
receives, from a serving cell, D2D configuration information informing a plurality of resource pools which can be used for transmission of a D2D signal; and
transmits the D2D signal based on a resource pool among the plurality of resource pools,
wherein the D2D configuration information includes information informing whether the resource pool is selected based on a reference signal received power (RSRP) or is selected randomly,
wherein, based on the resource pool being selected based on the RSRP, the resource pool is a resource pool having a measured RSRP value that is larger than a low threshold value and smaller than a high threshold value, and
wherein the low threshold value and the high threshold value are informed by the D2D configuration information.

6. The UE of claim 5, wherein the D2D configuration information informs the low threshold value and the high threshold value such that the UE selects only one resource pool upon the RSRP based pool selection.

7. The UE of claim 5, wherein the D2D signal comprises a signal for a D2D discovery.

8. The UE of claim 5, wherein the D2D signal comprises a signal for a D2D communication.

* * * * *